(12) United States Patent
Valenzuela et al.

(10) Patent No.: US 9,898,715 B2
(45) Date of Patent: Feb. 20, 2018

(54) SYSTEMS AND METHODS FOR CREATING, MANIPULATING AND PROCESSING RIGHTS AND CONTRACT EXPRESSIONS USING TOKENIZED TEMPLATES

(75) Inventors: Edgardo Valenzuela, South Gate, CA (US); Eddie J. Chen, Rancho Palos Verdes, CA (US); Thomas DeMartini, Culver City, CA (US); Joseph Zhung Yee Fung, Cerritos, CA (US); Mai Nguyen, Buena Park, CA (US); Vincent Hsiang Tieu, Torrance, CA (US); Duc Tran, Westminster, CA (US)

(73) Assignee: ContentGuart Holdings, Inc., Wilmington, DE (US)

( * ) Notice: Subject to any disclaimer, the term of this patent is extended or adjusted under 35 U.S.C. 154(b) by 2071 days.

(21) Appl. No.: 12/475,836

(22) Filed: Jun. 1, 2009

(65) Prior Publication Data
US 2009/0241199 A1 Sep. 24, 2009

Related U.S. Application Data

(62) Division of application No. 10/298,999, filed on Nov. 19, 2002, now Pat. No. 7,558,759.
(Continued)

(51) Int. Cl.
G06Q 20/00 (2012.01)
G06Q 10/10 (2012.01)
H04N 21/8355 (2011.01)

(52) U.S. Cl.
CPC ....... *G06Q 10/10* (2013.01); *H04N 21/83555* (2013.01)

(58) Field of Classification Search
USPC .................................. 705/51, 54, 59; 726/26
See application file for complete search history.

(56) References Cited

U.S. PATENT DOCUMENTS 4,159,468 A 6/1979 Barnes et al.
4,200,700 A 4/1980 Mäder
(Continued)

FOREIGN PATENT DOCUMENTS

BR 9810967 A 10/2001
EP 0 067 556 B1 12/1982
(Continued)

OTHER PUBLICATIONS

Petition for Inter Partes Review (IPR Case No. IPR2015-00442) of U.S. Pat. No. 6,963,859 filed Dec. 22, 2014.
(Continued)

*Primary Examiner* — John W Hayes
*Assistant Examiner* — John M Winter
(74) *Attorney, Agent, or Firm* — Rimon PC; Marc Kaufman

(57) ABSTRACT

System and methods for manipulating rights expressions for use in connection with a rights management system include one or more tokenized templates. Each tokenized template includes one or more rights expression language statements and one or more tokens associated with at least one of the rights expression language statements. Further, the tokens can be place holders for data items or rights expression elements. The system further includes a license template module that creates the tokenized templates, and a license instance creation module that replaces at least one of the tokens in one or more selected license templates with one or more of the data items or rights expression elements to generate a license instance. Additionally, the system includes a license instance analysis module having sub-modules for validating and interpreting license instances, and a data parsing module for extracting data from created license instances.

46 Claims, 15 Drawing Sheets

Related U.S. Application Data

(60) Provisional application No. 60/331,619, filed on Nov. 20, 2001, provisional application No. 60/331,622, filed on Nov. 20, 2011, provisional application No. 60/359,646, filed on Feb. 27, 2002, provisional application No. 60/359,661, filed on Feb. 27, 2002.

(56) References Cited

U.S. PATENT DOCUMENTS

| | | |
|---|---|---|
| 4,278,837 A | 7/1981 | Best |
| 4,361,851 A | 11/1982 | Asip et al. |
| 4,423,287 A | 12/1983 | Zeidler |
| 4,429,385 A | 1/1984 | Cichelli et al. |
| 4,621,321 A | 11/1986 | Boebert et al. |
| 4,652,990 A | 3/1987 | Pailen et al. |
| 4,658,093 A | 4/1987 | Hellman |
| 4,736,422 A | 4/1988 | Mason |
| 4,740,890 A | 4/1988 | William |
| 4,796,220 A | 1/1989 | Wolfe |
| 4,816,655 A | 3/1989 | Musyck et al. |
| 4,888,638 A | 12/1989 | Bohn |
| 4,937,863 A | 6/1990 | Robert et al. |
| 4,953,209 A | 8/1990 | Ryder et al. |
| 4,977,594 A | 12/1990 | Shear |
| 5,014,234 A | 5/1991 | Edwards |
| 5,058,162 A | 10/1991 | Santon et al. |
| 5,109,413 A | 4/1992 | Comerford et al. |
| 5,129,083 A | 7/1992 | Cutler et al. |
| 5,138,712 A | 8/1992 | Corbin |
| 5,174,641 A | 12/1992 | Lim |
| 5,204,897 A | 4/1993 | Wyman |
| 5,247,575 A | 9/1993 | Sprague et al. |
| 5,260,999 A | 11/1993 | Wyman |
| 5,276,444 A | 1/1994 | McNair |
| 5,287,408 A | 2/1994 | Samson |
| 5,291,596 A | 3/1994 | Mita |
| 5,293,422 A | 3/1994 | Loiacono |
| 5,335,275 A | 8/1994 | Millar et al. |
| 5,337,357 A | 8/1994 | Chou et al. |
| 5,386,369 A | 1/1995 | Christiano |
| 5,390,297 A | 2/1995 | Barber et al. |
| 5,412,717 A | 5/1995 | Fischer |
| 5,414,852 A | 5/1995 | Kramer et al. |
| 5,453,601 A | 9/1995 | Rosen |
| 5,477,263 A | 12/1995 | O'Callaghan et al. |
| 5,485,577 A | 1/1996 | Eyer et al. |
| 5,504,816 A | 4/1996 | Hamilton et al. |
| 5,530,235 A | 6/1996 | Stefik et al. |
| 5,535,276 A | 7/1996 | Ganesan |
| 5,553,143 A | 9/1996 | Ross et al. |
| 5,557,518 A | 9/1996 | Rosen |
| 5,557,678 A | 9/1996 | Ganesan |
| 5,564,038 A | 10/1996 | Grantz et al. |
| 5,619,570 A | 4/1997 | Tsutsui |
| 5,625,690 A | 4/1997 | Michel et al. |
| 5,629,980 A | 5/1997 | Stefik et al. |
| 5,634,012 A | 5/1997 | Stefik et al. |
| 5,638,513 A | 5/1997 | Ananda |
| 5,636,346 A | 6/1997 | Saxe |
| 5,638,443 A | 6/1997 | Stefik et al. |
| 5,673,316 A | 9/1997 | Auerbach et al. |
| 5,703,951 A | 12/1997 | Dolphin |
| 5,708,709 A | 1/1998 | Rose |
| 5,715,403 A | 2/1998 | Stefik |
| 5,717,604 A | 2/1998 | Wiggins |
| 5,745,879 A | 4/1998 | Wyman |
| 5,764,807 A | 6/1998 | Pearlman et al. |
| 5,765,152 A | 6/1998 | Erickson |
| 5,787,172 A | 7/1998 | Arnold |
| 5,790,677 A | 8/1998 | Fox et al. |
| 5,812,664 A | 9/1998 | Bernobich et al. |
| 5,825,876 A | 10/1998 | Peterson |
| 5,825,879 A | 10/1998 | Davis |
| 5,838,792 A | 11/1998 | Ganesan |
| 5,848,154 A | 12/1998 | Nishio et al. |
| 5,848,378 A | 12/1998 | Shelton et al. |
| 5,850,433 A | 12/1998 | Van Oorschot et al. |
| 5,892,900 A | 4/1999 | Ginter et al. |
| 5,915,019 A | 6/1999 | Ginter et al. |
| 5,917,912 A | 6/1999 | Ginter et al. |
| 5,933,498 A | 8/1999 | Schneck et al. |
| 5,940,504 A | 8/1999 | Griswold |
| 5,982,891 A | 11/1999 | Ginter et al. |
| 5,987,134 A | 11/1999 | Shin et al. |
| 5,999,624 A | 12/1999 | Hopkins |
| 6,006,332 A | 12/1999 | Rabne et al. |
| 6,020,882 A | 2/2000 | Kinghorn et al. |
| 6,044,466 A | 3/2000 | Anand et al. |
| 6,047,067 A | 4/2000 | Rosen |
| 6,073,234 A | 6/2000 | Kigo et al. |
| 6,091,777 A | 7/2000 | Guetz et al. |
| 6,112,239 A | 8/2000 | Kenner et al. |
| 6,115,471 A | 9/2000 | Oki et al. |
| 6,135,646 A | 10/2000 | Kahn et al. |
| 6,138,119 A | 10/2000 | Hall et al. |
| 6,141,754 A | 10/2000 | Choy |
| 6,157,719 A | 12/2000 | Wasilewski et al. |
| 6,169,976 B1 | 1/2001 | Colosso |
| 6,185,683 B1 | 2/2001 | Ginter et al. |
| 6,189,037 B1 | 2/2001 | Adams et al. |
| 6,189,146 B1 | 2/2001 | Misra et al. |
| 6,209,092 B1 | 3/2001 | Linnartz |
| 6,216,112 B1 | 4/2001 | Fuller et al. |
| 6,219,652 B1 | 4/2001 | Carter et al. |
| 6,226,618 B1 | 5/2001 | Downs et al. |
| 6,236,971 B1 * | 5/2001 | Stefik et al. ............ 705/54 |
| 6,286,043 B1 | 9/2001 | Cuomo et al. |
| 6,307,939 B1 | 10/2001 | Vigarie |
| 6,327,652 B1 | 12/2001 | England et al. |
| 6,353,888 B1 | 3/2002 | Kakehi et al. |
| 6,389,538 B1 | 5/2002 | Gruse et al. |
| 6,397,333 B1 | 5/2002 | Söhne et al. |
| 6,401,211 B1 | 6/2002 | Brezak, Jr. et al. |
| 6,405,369 B1 | 6/2002 | Tsuria |
| 6,424,717 B1 | 7/2002 | Pinder et al. |
| 6,424,947 B1 | 7/2002 | Tsuria et al. |
| 6,487,659 B1 | 11/2002 | Kigo et al. |
| 6,516,052 B2 | 2/2003 | Voudouris |
| 6,516,413 B1 | 2/2003 | Aratani et al. |
| 6,523,745 B1 | 2/2003 | Tamori |
| 6,574,605 B1 | 6/2003 | Sanders et al. |
| 6,587,837 B1 | 7/2003 | Spagna et al. |
| 6,708,157 B2 | 3/2004 | Stefik et al. |
| 6,738,155 B1 | 5/2004 | Rosenlund et al. |
| 6,754,642 B2 | 6/2004 | Tadayon et al. |
| 6,796,555 B1 | 9/2004 | Blahut |
| 6,895,392 B2 | 5/2005 | Stefik et al. |
| 6,920,567 B1 | 7/2005 | Doherty et al. |
| 6,963,859 B2 | 11/2005 | Stefik et al. |
| 7,068,787 B1 | 6/2006 | Ta et al. |
| 7,085,741 B2 | 8/2006 | Lao et al. |
| 7,225,160 B2 | 5/2007 | Stefik et al. |
| 7,269,576 B2 | 9/2007 | Stefik et al. |
| 7,523,072 B2 | 4/2009 | Stefik et al. |
| 7,565,697 B2 * | 7/2009 | LeVine et al. ............ 726/26 |
| 7,774,280 B2 | 8/2010 | Wang et al. |
| 8,001,053 B2 | 8/2011 | Nguyen et al. |
| 8,001,054 B1 | 8/2011 | Peart et al. |
| 8,370,956 B2 | 2/2013 | Stefik et al. |
| 8,393,007 B2 | 3/2013 | Stefik et al. |
| 2001/0009026 A1 | 7/2001 | Terao et al. |
| 2001/0011276 A1 | 8/2001 | Durst, Jr. et al. |
| 2001/0014206 A1 | 8/2001 | Artigalas et al. |
| 2001/0037467 A1 | 11/2001 | O'Toole, Jr. et al. |
| 2001/0039659 A1 | 11/2001 | Simmons et al. |
| 2002/0001387 A1 | 1/2002 | Dillon |
| 2002/0035618 A1 | 3/2002 | Mendez et al. |
| 2002/0044658 A1 | 4/2002 | Wasilewski et al. |
| 2002/0056118 A1 | 5/2002 | Hunter et al. |
| 2002/0069282 A1 | 6/2002 | Reisman |
| 2002/0077984 A1 | 6/2002 | Ireton |
| 2002/0095387 A1 | 7/2002 | Sosa et al. |
| 2002/0099948 A1 | 7/2002 | Kocher et al. |
| 2002/0127423 A1 | 9/2002 | Kayanakis |

(56) References Cited

U.S. PATENT DOCUMENTS

| | | | |
|---|---|---|---|
| 2003/0009423 A1* | 1/2003 | Wang et al. | 705/51 |
| 2003/0097567 A1 | 5/2003 | Terao et al. | |
| 2004/0052370 A1 | 3/2004 | Katznelson | |
| 2004/0172552 A1 | 9/2004 | Boyles et al. | |
| 2006/0106763 A1 | 5/2006 | Dirisala | |

FOREIGN PATENT DOCUMENTS

| | | |
|---|---|---|
| EP | 0 257 585 A2 | 3/1988 |
| EP | 0 262 025 A2 | 3/1988 |
| EP | 0268139 A2 | 5/1988 |
| EP | 0 332 304 A2 | 9/1989 |
| EP | 0 393 806 A2 | 10/1990 |
| EP | 0 450 841 A2 | 10/1991 |
| EP | 0 529 261 A2 | 3/1993 |
| EP | 0567800 A1 | 11/1993 |
| EP | 0 613 073 A1 | 8/1994 |
| EP | 0 678 836 A1 | 10/1995 |
| EP | 0 679 977 A1 | 11/1995 |
| EP | 0 715 243 A1 | 6/1996 |
| EP | 0 715 244 A1 | 6/1996 |
| EP | 0 715 245 A1 | 6/1996 |
| EP | 0 731 404 A1 | 9/1996 |
| EP | 0 763 936 A2 | 3/1997 |
| EP | 0 818 748 A2 | 1/1998 |
| EP | 0 840 194 A2 | 5/1998 |
| EP | 0 892 521 A2 | 1/1999 |
| EP | 0 934 765 A1 | 8/1999 |
| EP | 0 946 022 A2 | 9/1999 |
| EP | 0 964 572 A1 | 12/1999 |
| EP | 1 103 922 A2 | 5/2001 |
| GB | 1483282 | 8/1977 |
| GB | 2022969 A | 12/1979 |
| GB | 2236604 A | 4/1991 |
| GB | 2309364 A | 7/1997 |
| GB | 2316503 A | 2/1998 |
| GB | 2354102 A | 3/2001 |
| JP | 3-063717 A | 3/1991 |
| JP | H4-180451 | 6/1992 |
| JP | 5-100939 | 4/1993 |
| JP | 5168039 A2 | 7/1993 |
| JP | 6-131371 A | 5/1994 |
| JP | 7-036768 | 2/1995 |
| JP | 11031130 A2 | 2/1999 |
| JP | 11032037 A2 | 2/1999 |
| JP | 11205306 A2 | 7/1999 |
| JP | 11215121 A2 | 8/1999 |
| JP | 2000215165 A2 | 8/2000 |
| JP | 2005218143 A2 | 8/2005 |
| JP | 2005253109 A2 | 9/2005 |
| JP | 2006180562 A2 | 7/2006 |
| WO | WO 83/04461 A1 | 12/1983 |
| WO | WO 92/20022 A1 | 11/1992 |
| WO | WO 93/01550 A1 | 1/1993 |
| WO | WO 93/11480 A1 | 6/1993 |
| WO | WO 94/03003 A1 | 2/1994 |
| WO | WO 96/13814 A1 | 5/1996 |
| WO | WO 96/24092 A2 | 8/1996 |
| WO | WO 96/27155 A2 | 9/1996 |
| WO | WO 97/25800 A1 | 7/1997 |
| WO | WO 97/37492 A1 | 10/1997 |
| WO | WO 97/41661 A2 | 11/1997 |
| WO | WO 97/43761 A2 | 11/1997 |
| WO | WO 98/09209 A1 | 3/1998 |
| WO | WO 98/10561 A1 | 3/1998 |
| WO | WO 98/11690 A1 | 3/1998 |
| WO | WO 98/19431 A1 | 5/1998 |
| WO | WO 98/43426 A1 | 10/1998 |
| WO | WO 98/45768 A1 | 10/1998 |
| WO | WO 99/24928 A1 | 5/1999 |
| WO | WO 99/34553 A1 | 7/1999 |
| WO | WO 99/35782 A1 | 7/1999 |
| WO | WO 99/48296 A1 | 9/1999 |
| WO | WO 99/60461 A1 | 11/1999 |
| WO | WO 99/60750 A2 | 11/1999 |
| WO | WO 00/04727 A2 | 1/2000 |
| WO | WO 00/05898 A2 | 2/2000 |
| WO | WO 00/46994 A1 | 8/2000 |
| WO | WO 00/59152 A2 | 10/2000 |
| WO | WO 00/62260 A1 | 10/2000 |
| WO | WO 00/72118 A1 | 11/2000 |
| WO | WO 00/73922 A2 | 12/2000 |
| WO | WO 01/03044 A1 | 1/2001 |
| WO | WO 01/37209 A1 | 5/2001 |
| WO | WO 04/34223 A2 | 4/2004 |
| WO | WO 04/103843 | 12/2004 |

OTHER PUBLICATIONS

Petition for Inter Partes Review (IPR Case No. IPR2015-00443) of U.S. Pat. No. 7,523,072 filed Dec. 22, 2014.
Petition for Inter Partes Review (IPR Case No. IPR2015-00444) of U.S. Pat. No. 7,523,072 filed Dec. 22, 2014.
Petition for Inter Partes Review (IPR Case No. IPR2015-00445) of U.S. Pat. No. 7,523,072 filed Dec. 22, 2014.
Petition for Inter Partes Review (IPR Case No. IPR2015-00446) of U.S. Pat. No. 8,370,956 filed Dec. 22, 2014.
Petition for Inter Partes Review (IPR Case No. IPR2015-00447) of U.S. Pat. No. 8,370,956 filed Dec. 22, 2014.
Petition for Inter Partes Review (IPR Case No. IPR2015-00448) of U.S. Pat. No. 8,370,956 filed Dec. 22, 2014.
Petition for Inter Partes Review (IPR Case No. IPR2015-00449) of U.S. Pat. No. 8,393,007 filed Dec. 22, 2014.
Petition for Inter Partes Review (IPR Case No. IPR2015-00450) of U.S. Pat. No. 8,393,007 filed Dec. 22, 2014.
Petition for Inter Partes Review (IPR Case No. IPR2015-00451) of U.S. Pat. No. 8,393,007 filed Dec. 22, 2014.
Petition for Inter Partes Review (IPR Case No. IPR2015-00452) of U.S. Pat. No. 7,269,576 filed Dec. 22, 2014.
Petition for Inter Partes Review (IPR Case No. IPR2015-00453) of U.S. Pat. No. 7,269,576 filed Dec. 22, 2014.
Petition for Inter Partes Review (IPR Case No. IPR2015-00454) of U.S. Pat. No. 7,269,576 filed Dec. 22, 2014.
Petition for Inter Partes Review (IPR Case No. IPR2015-00455) of U.S. Pat. No. 7,269,576 filed Dec. 22, 2014.
Petition for Inter Partes Review (IPR Case No. IPR2015-00456) of U.S. Pat. No. 7,269,576 filed Dec. 22, 2014.
Petition for Inter Partes Review (IPR Case No. IPR2015-00457) of U.S. Pat. No. 7,225,160 filed Dec. 22, 2014.
Petition for Inter Partes Review (IPR Case No. IPR2015-00458) of U.S. Pat. No. 7,225,160 filed Dec. 22, 2014.
Proceedings of the Technological Strategies for Protecting Intellectual Property in the Networked Multimedia Environment, Journal of the Interactive Multimedia Association Intellectual Property Project (Jan. 1, 1994).
Record of Oral Hearing, Sessions 1 and 2, in *ZTE Corporation and ZTE (USA) Inc.* v. *ContentGuard Holdings Inc.*, IPR2013-00138, Paper 54.
Remarks in Amendment of U.S. Appl. No. 10/956,070 dated Jul. 17, 2006.
Remarks in Amendment of U.S. Appl. No. 10/956,070 dated Nov. 22, 2010.
Remarks in Amendment of U.S. Appl. No. 10/956,070 dated Jan. 24, 2006.
Remarks in Amendment of U.S. Appl. No. 10/956,070 dated Oct. 31, 2007.
Remarks in Amendment of U.S. Appl. No. 10/956,121 dated Mar. 15, 2010.
Remarks in Amendment of U.S. Appl. No. 10/956,121 dated May 28, 2009.
RFC 1422, Privacy Enhanced Mail (PEM) Part II: Certificate-Based Key Management, 1993.
S. White & L. Comerford, ABYSS: A Trusted Architecture for Software Protection (1990).
*Salesforce.com, Inc.* v. *Virtualagility, Inc.*, CBM2013-00024, Paper No. 47 (Sep. 16, 2014).
Saltzer J.,& M. Schroeder, The Protection of Information in Computer Systems, Proceedings of the IEEE, vol. 63, No. 9 (Sep. 1975).

(56) References Cited

OTHER PUBLICATIONS

*SAP America, Inc.* v. *Versata Dev. Group, Inc.*, CBM2012-00001, Paper 36 (Jan. 9, 2013).
*SAP America, Inc.* v. *Versata Development Group, Inc.*, CBM2012-00001, Paper No. 70 (Jun. 11, 2013).
Steiner et al., Kerberos: An Authentication Service for Open Network Systems (MIT 1988).
Summons in Case No. 2:13-CV-01112.
T. Berners-Lee & D. Connolly, RFC 1866, Hypertext Markup Language v2.0 (Nov. 1995).
The Copy-Protection Wars, PC Magazine Cover, Table of contents, 164-182, 1986.
The Digital Property Rights Language—Manual and Tutorial—XML Edition, Version 2, http://xml.coverpages.org/DPRLmanual-XML2.html (Nov. 13, 1998).
Tygar J.D., et al., "Dyad: A System for Using Physically Secure Coprocessors," Ima Intellectual Property Project Proceedings, 1994, vol. 1 (1), pp. 121-152.
*Ultramercial, Inc. et al.* v. *Hulu, LLC et al.*, 2010-1544 (Fed Cir. Nov. 14, 2014).
U.S. Continuation-in-Part U.S. Appl. No. 09/867,745, filed May 31, 2001.
U.S. Continuation-in-Part U.S. Appl. No. 10/162,212, filed Jun. 5, 2002.
U.S. Continuation-in-Part U.S. Appl. No. 10/162,701, filed Jun. 6, 2002.
U.S. Appl. No. 60/296,113, filed Jun. 7, 2001.
U.S. Appl. No. 60/296,117, filed Jun. 7, 2001.
U.S. Appl. No. 60/296,118, filed Jun. 7, 2001.
U.S. Appl. No. 60/331,621, filed Nov. 20, 2001.
U.S. Appl. No. 60/331,623, filed Nov. 20, 2001.
U.S. Appl. No. 60/331,624, filed Nov. 20, 2001.
U.S. Appl. No. 60/331,625, filed Nov. 20, 2001.
*Volusion, Inc.* v. *Versata Software, Inc. et al.*, CBM2013-00017, Paper No. 8 (Oct. 24, 2013).
Weingart S., Physical Security for the µABYSS System, Proceedings of the IEEE Symposium on Security and Privacy (Apr. 27-29, 1987).
File History for U.S. Pat. No. 8,001,053, Nov. 22, 2011 Amendment After Final Rejection.
File History of U.S. Pat. No. 6,135,646 filed Feb. 28, 1997.
File History of U.S. Pat. No. 6,963,859 filed Jan. 16, 2003.
File History of U.S. Pat. No. 7,225,160 filed Dec. 17, 2001.
File History of U.S. Pat. No. 7,269,576 filed Feb. 9, 2004.
File History of U.S. Pat. No. 7,523,072 filed Dec. 16, 2005.
File History of U.S. Pat. No. 7,774,280 filed Oct. 4, 2004.
File History of U.S. Pat. No. 8,001,053 filed Oct. 4, 2004.
File History of U.S. Pat. No. 8,370,956 filed Aug. 13, 2012.
File History of U.S. Pat. No. 8,393,007 filed Aug. 14, 2012.
File History of U.S. Appl. No. 08/967,084 & U.S. Appl. No. 08/344,760, filed Nov. 10, 1997 & Nov. 23, 1994.
File History of U.S. Appl. No. 09/778,001, filed Feb. 7, 2001.
Final Decision in *ZTE Corporation and ZTE (USA) Inc.* v. *ContentGuard Holdings Inc.*, IPR2013-00133, Paper 61 (Jul. 1, 2014).
Final Decision in *ZTE Corporation and ZTE (USA) Inc.* v. *ContentGuard Holdings Inc.*, IPR2013-00137, Paper 58 (Jul. 1, 2014).
Final Decision in *ZTE Corporation and ZTE (USA) Inc.* v. *ContentGuard Holdings Inc.*, IPR2013-00139, Paper 57 (Jun. 26, 2014).
Final Office Action dated Apr. 17, 2006 for U.S. Appl. No. 10/956,070, filed Oct. 4, 2004.
Final Office Action dated Apr. 17, 2008 for U.S. Appl. No. 10/162,701, filed Jun. 6, 2002.
Final Office Action dated Aug. 19, 2009 for U.S. Appl. No. 10/956,121, filed Oct. 4, 2004.
Final Office Action dated May 24, 2006 for U.S. Appl. No. 10/162,701, filed Jun. 6, 2002.
Glenn C. Reid, Thinking in Postscript, Addison-Wesley (1990).
*Google Inc.* v. *Inventor Holdings, LLC*, CBM2014-00002, Paper No. 16 (Apr. 1, 2014).
*Hulu, LLC* v. *Intertainer, Inc.* Case CBM2014-00053, Paper 11 (Jun. 23, 2014).
Iannella, R., Open Digital Rights Language (ODRL), Version 7, http://xml.coverpages.org/ODRL-07.pdf (Oct. 13, 2000).
Internet Dreams Archetypes, Myths, and Metaphors—Stefik foreword.
Kahin, Brian, The Strategic Environment for Protecting Multimedia, IMA Intellectual Property Project Proceedings, Jan. 1994.
"Law Borrowing & Returning," The University of Chicago, available at http://www.lib.uchicago.edu/e/law/usig/borrow/.
Linn R.J., et al., "Copyright and Information Services in the Context of the National Research and Education Network. sup.1," Ima Intellectual Property Project Proceedings, 1994, vol. 1 (1), pp. 9-20.
Microsoft Computer Dictionary (5th Ed.) (2002).
Moffett J., et al., Specifying Discretionary Access Control Policy for Distributed Systems, Computer Communications, vol. 13(9), pp. 571-580 (Nov. 1990).
Mori, R., Superdistribution: The Concept and Architecture, The Transactions of the Institute of Electronics, Information and Comm. Engineers (Jul. 1990), No. 7, pp. 1133.
Morin, J., Commercialization of Electronic Information, Journal of Organizational and End User Computing, vol. 12, Issue 2 (Apr. 1, 2000).
Needham & Schroeder, Using Encryption for Authentication in Large Networks of Computers (Dec. 1978).
Non-Final Office Action dated Aug. 10, 2007 for U.S. Appl. No. 10/162,701, filed Jun. 6, 2002.
Non-Final Office Action dated Apr. 15, 2008 for U.S. Appl. No. 10/956,121, filed Oct. 4, 2004.
Non-Final Office Action dated Oct. 21, 2005 for U.S. Appl. No. 10/162,701, filed Jun. 6, 2002.
Non-Final Office Action dated Oct. 25, 2005 for U.S. Appl. No. 10/956,070, filed Oct. 4, 2004.
Notice of Abandonment dated May 2, 2011 for U.S. Appl. No. 10/162,701, filed Jun. 6, 2002.
Office Patent Trial Practice Guide, 77 Fed. Reg. 157 (Aug. 14, 2012).
Petition for Covered Business Method Patent Review (CBM Case No. CBM2015-00040) of U.S. Pat. No. 7,774,280 filed Dec. 10, 2014.
Petition for Covered Business Method Patent Review (CBM Case No. CBM2015-00043) of U.S. Pat. No. 8,001,053 filed Dec. 10, 2014.
Petition for Inter Partes Review (IPR Case No. IPR2015-00351) of U.S. Pat. No. 7,774,280 filed Dec. 10, 2014.
Petition for Inter Partes Review (IPR Case No. IPR2015-00352) of U.S. Pat. No. 7,774,280 filed Dec. 10, 2014.
Petition for Inter Partes Review (IPR Case No. IPR2015-00353) of U.S. Pat. No. 7,774,280 filed Dec. 10, 2014.
Petition for Inter Partes Review (IPR Case No. IPR2015-00354) of U.S. Pat. No. 7,774,280 filed Dec. 10, 2014.
Petition for Inter Partes Review (IPR Case No. IPR2015-00355) of U.S. Pat. No. 8,001,053 filed Dec. 10, 2014.
Petition for Inter Partes Review (IPR Case No. IPR2015-00356) of U.S. Pat. No. 8,001,053 filed Dec. 10, 2014.
Petition for Inter Partes Review (IPR Case No. IPR2015-00357) of U.S. Pat. No. 8,001,053 filed Dec. 10, 2014.
Petition for Inter Partes Review (IPR Case No. IPR2015-00358) of U.S. Pat. No. 8,001,053 filed Dec. 10, 2014.
Petition for Inter Partes Review (IPR Case No. IPR2015-00440) of U.S. Pat. No. 6,963,859 filed Dec. 22, 2014.
Petition for Inter Partes Review (IPR Case No. IPR2015-00441) of U.S. Pat. No. 6,963,859 filed Dec. 22, 2014.
Blaze et al, "Divertible Protocols and Atomic Proxy Cryptography" 1998 Advances in Cryptography—Euro Crypt International Conference on the Theory and Application of Crypto Techniques, Springer Verlag, DE.
Blaze et al, "Atomic Proxy Cryptography" DRAFT (Online) (Nov. 2, 1997) XP002239619 Retrieved from the Internet.
No Author, "Capability- and Object-Based Systems Concepts," Capability-Based Computer Systems, pp. 1-19 (no date).

(56) References Cited

OTHER PUBLICATIONS

Cox, "Superdistribution" Wired Magazine (Sep. 1994) XP002233405 URL:http:/ /www.wired.com/wired/archive/2.09/superdis_pr.html>.

Dunlop et al, Telecommunications Engineering, pp. 346-352 (1984).

Elgamal, "A Public Key Cryptosystem and a Signature Scheme Based on Discrete Logarithms," IEEE Transactions on Information Theory IT-31(4):469-472 (Jul. 1985).

Gheorghiu et al., "Authorization for Metacomputing Applications" (no date).

Iannella, ed., Open Digital Rights Language (ODRL), pp. 1-31 (Nov. 21, 2000).

Kahle, wais.concepts.txt, Wide Area Information Server Concepts, Thinking Machines Version 4, Draft, pp. 1-18 (Nov. 3, 1989).

Kahn, "Deposit, Registration and Recordation in an Electronic Copyright Management System," Technical Report, Corporation for National Research Initiatives, Reston, Virginia (Aug. 1992) URL:http:/ /www.cni.org/docs/ima.ip-workshop/kahn.html.

Kahn et al, "The Digital Library Project, vol. 1: The World of Knowbots (DRAFT), An Open Architecture for a Digital Library System and a Plan for its Development," Corporation for National Research Initiatives, pp. 1-48 (Mar. 1988).

Kohl et al, Network Working Group Request for Comments: 1510, pp. 1-112 (Sep. 1993).

Lee et al, CDMA Systems Engineering Handbook (1998) [excerpts but not all pages numbered].

Mambo et al, "Protection of Data and Delegated Keys in Digital Distribution," Information Security and Privacy. Second Australian Conference, ACISP '97 Proceedings, pp. 271-282 (Sydney, NSW, Australia, Jul. 7-9, 1997, 1997 Berlin, Germany, Springer-Verlag, Germany), XP008016393 ISBN: 3-540-63232-8.

Mambo et al, "Proxy Cryptosystems: Delegation of the Power to Decrypt Ciphertexts,", IEICE Trans. Fundamentals vol. E80-A, No. 1:54-63 (Jan. 1997) XP00742245 ISSN: 0916-8508.

Microsoft Word, Users Guide, Version 6.0, pp. 487-489, 549-555, 560-564, 572-575, 599-613, 616-631 (1993).

Ojanperä and Prasad, eds., Wideband CDMA for Third Generation Mobile Communications (1998) [excerpts but not all pages numbered].

Perritt, "Knowbots, Permissions Headers and Contract Law," Paper for the Conference on Technological Strategies for Protecting Intellectual Property in the Networked Multimedia Environment, pp. 1-22 (Apr. 2-3, 1993 with revisions of Apr. 30, 1993).

Raggett, (Hewlett Packard), "HTML+(Hypertext markup language)," pp. 1-31 (Jul. 12, 1993) URL:http:/ /citeseer.ist.psu.edu/correct/340709.

Samuelson et al, "Intellectual Property Rights for Digital Library and Hypertext Publishing Systems: An Analysis of Xanadu," Hypertext '91 Proceedings, pp. 39-50 (Dec. 1991).

No Author, "Softlock Services Introduces . . . Softlock Services" Press Release (Jan. 28, 1994).

No Author, "Appendix III—Compatibility with HTML," No Title, pp. 30-31 (no date).

No Editor, No Title, Dictionary pages, pp. 469-472, 593-594 (no date).

Benoit, Digital Television MPEG-1, MPEG-2 and Principles of the DVB System, pp. 75-80, 116-121 (no date).

Benoit, Digital Television MPEG-1, MPEG-2 and Principles of the DVB System, $2^{nd}$ edition, pp. 74-80 (no date).

Ah Digital Audio and Video Series, "DTV Receivers and Measurements," Understanding Digital Terrestrial Broadcasting, pp. 159-164 (no date).

O'Driscoll, The Essential Guide to Digital Set-Top Boxes and Interactive TV, pp. 6-24 (no date).

Ius Mentis, "The ElGamal Public Key System," pp. 1-2 (Oct. 1, 2005) online at http:/ /www.iusmentis.com/technology/encyrption/elgamal/.

Schneier, "Crypto Bibliography," Index of Crypto Papers Available Online, pp. 1-2 (online) (no date).

No Author, No Title, pp. 344-355 (no date).

No Author, "Part Four Networks," No Title, pp. 639-714 (no date).

Microsoft Word User's Guide, pp. 773-774, 315-316, 487-489, 561-564, 744, 624-633 (1993).

No Author, "What is the ElGamal Cryptosystem," p. 1 (Nov. 27, 2006) online at http:/ /www.x5.net/faqs/crypto/q29.html.

Johnson et al., "A Secure Distributed Capability Based System," ACM, pp. 392-402 (1985).

Wikipedia, "El Gamal Encyption," pp. 1-3 (last modified Nov. 2, 2006) online at http:/ /en.wikipedia.org/wiki/ElGamal_encryption.

Blaze, "Atomic Proxy Cryptography," p. 1 Abstract (Oct. 20, 1998).

Blaze, "Matt Blaze's Technical Papers," pp. 1-6 (last updated Aug. 6, 2006)].

Online Search Results for "inverted file", "inverted index" from www.techweb.com, www.cryer.co.uk, computing-dictionary. thefreedictionary.com, www.nist.gov, en.wikipedia.org, www.cni. org, www.tiscali.co.uk (Jul. 15-16, 2006).

Corporation for National Research Initiatives, "Digital Object Architecture Project", http:/ /www.nnri.reston.va.us/doa.html (updated Nov. 28, 2006).

Stefik, Summary and Analysis of A13 (Kahn, Robert E and Vinton G Cerf, "The Digital Library Project, vol. 1: The World of Knowbots (DRAFT), An Open Architecture for a Digital Library System and a Plan for its Development," Corporation for National Research Initiatives (Mar. 1988)), pp. 1-25 (May 30, 2007).

Johnson et al., "A Secure Distributed Capability Based System," Proceedings of the 1985 ACM Annual Conference on the Range of Computing: Mid-80's Perspective: Mid-80's Perspective *Association for Computing Machinery* pp. 392-402 (1985).

Contentguard; "The Need for a Rights Language—Technical White Paper—Version 1.0"; Contentguard White Paper; 'Online!, Nov. 9, 2001; XP-002333474; pp. 1-12.

Contentguard; "XRML: Extensible Rights Markup Language—Version 1.2"; Contentguard XRML 1.2; 'Online!; Oct. 30, 2001; XP-002333475; pp. 1-134; http:/ /www.xrml.org.

Contentguard; "Contentguard XRML Software Development Kit User's Guide—Release 2.0—Driving the Standard for Interoperability in Digital Rights"; Contentguard XRML SDK 2.0; 'Online!; Nov. 30, 2001; XP-002333477.

European Search Report for EP 02 78 6733; dated Aug. 31, 2005.

Perritt, "Technologies Strategies for Protecting IP in the Network Multimedia Environment", Apr. 2-3, 1993, Knowbot Permissions.

Delaigle, "Digital Watermarking", SPIE Conference in Optical Security and Counterfeit Deterrence Techniques, San Jose, CA Feb. 1996, vol. 2659 pp. 99-110.

Microsoft Press Computer Dictionary, 3rd Edition, 1997, p. 285.

Lampson et al., Authentication in Distributed Systems: Theory and Practice, ACM, 1992, pp. 1-47.

*Alice Corp. Pty. Ltd.* v. *CLS Bank Int'l*, 134 S.Ct. 2347 (Jun. 19, 2014).

American Heritage Dictionary Third Edition.

Amir Herzberg, Shlomit S. Pinter, "Public Protection of Software," in Advances in Cryptology: Proc. Crypto 85, Hugh C. Williams (ed.), pp. 158 (1986).

*Apple Inc.* v. *Sightsound Techs., LLC*, CBM2013-00019, Paper No. 17 (Oct. 8, 2013).

*Bloomberg Inc. et al.* v. *Markets-Alert PTY LTD*, CBM2013-00005, Paper No. 18 (Mar. 29, 2013).

Board of Patent Appeals and Interferences Decision on Appeal, U.S. Appl. No. 10/162,701 dated Jul. 27, 2010.

Bray et al., "Extensible Markup Language (XML) 1.0," W3C Recommendation, Feb. 10, 1998.

Bruce Schneier, Applied Cryptography (Chapters 1-3, 7, 12, 13, 17)-1994.

Cina V., et al., ABYSS: A Basic Yorktown Security System: PC Asset Protection Concepts, IBM Research Report No. RC 12401 (Dec. 1986).

CNRI Workshop on the Protection of Intellectual Property Rights in a Digital Library System May 18-19, 1989.

Comparison of Specification of U.S. Appl. No. 08/967,084 to Specification of U.S. Appl. No. 09/778,001.

Comparison of Specification of U.S. Appl. No. 09/778,001 to Specification of U.S. Pat. No. 7,225,160.

(56) References Cited

OTHER PUBLICATIONS

Comparison of Stefik '980 Patent to Specification of U.S. Appl. No. 09/778,001.
Complaint, *ContentGuard Holdings, Inv. v. Google Inc.*, Case No. 2:14-cv-00061-JRG-RSP (E.D. Tex.), Dkt. No. 1.
Congressional Record—Senate, 157 Cong. Rec. S1360-1394 (daily ed. Mar. 8, 2011) (Sen. Schumer).
ContentGuard's Opening Claim Construction Brief, 2:13-cv-01112 (EDTX) Dkt No. 304.
Curriculum Vitae for Alan Sherman.
Curriculum Vitae of Atul Prakash.
D. Denning, Cryptography and Data Security (1982).
Data networks and open system communicationjs X.509 Standard.
Davida G., et al., Defending Systems Against Viruses through Cryptographic Authentication, IEEE 1989.
Decision on Appeal, U.S. Appl. No. 10/162,212 (BPAI) dated Dec. 16, 2009.
Decision to Institute in *ZTE Corporation and ZTE (USA) Inc. v. ContentGuard Holdings Inc.*, IPR2013-00133, Paper 15 (Jul. 1, 2013).
Decision to Institute in *ZTE Corporation and ZTE (USA) Inc. v. ContentGuard Holdings Inc.*, IPR2013-00134, Paper 12 (Jun. 19, 2013).
Decision to Institute in *ZTE Corporation and ZTE (USA) Inc. v. ContentGuard Holdings Inc.*, IPR2013-00136, Paper 11 (Jul. 16, 2013).
Decision to Institute in *ZTE Corporation and ZTE (USA) Inc. v. ContentGuard Holdings Inc.*, IPR2013-00137, Paper 17 (Jul. 1, 2013).
Decision to Institute in *ZTE Corporation and ZTE (USA) Inc. v. ContentGuard Holdings Inc.*, IPR2013-00138, Paper 17 (Jul. 1, 2013).
Decision to Institute in *ZTE Corporation and ZTE (USA) Inc. v. ContentGuard Holdings Inc.*, IPR2013-00139, Paper 15 (Jul. 9, 2013).
Declaration of Alan Sherman, Ph. D. regarding patent 160.
Declaration of Alan Sherman, Ph. D. regarding patents 859, 072, 956, 007, 576.
Declaration of Atul Prakash "System and Method for Managing Transfer of Rights Using Shared State Variables".
Declaration of Benjamin Goldberg, Ph.D.
Declaration of Dr. Goodrich in support of ContentGuard's Opening Claim Construction Brief—Exhibit K of Doc. No. 304.
Definition of "Meta," Oxford English Dictionary www.oxford-dictionaries.com/definition/english/meta.
Definition of "Processor," The American Heritage® Dictionary of the English Language, Fourth Edition, 2000 Houghton Mifflin Company, available at http://www.thefreedictionary.com/processor.
Definition of "Right," Merriam-Webster Online Dictionary, available at http://www.merriam-webster.com/dictionary/right.
Definition of "Variable," The Free Dictionary, available at http://www.thefreedictionary.com/variable+%28computer+science%29.
Diffie-Hellman, "New Directions in Cryptography," IEEE Transactions on Information Theory, vol. IT-22, No. 6, Nov. 1976.
*EBay, Inc. v. Paid, Inc.*, CBM2014-00125, Paper No. 15 (Sep. 30, 2014).
Electronic Books Exchange (EBX) Specification 0.8 (Jul. 2000).
*Experian Marketing Solutions, Inc. v. RPost Communications Ltd.*, CBM2014-00010, Paper No. 20 (Apr. 22, 2014).
Federal Information Processing Standards Publication PUB 140-1, dated Jan. 11, 1994.
File History for U.S. Appl. No. 10/163,634, Feb. 18, 2010 Decision on Appeal.
File History for U.S. Pat. No. 7,774,280, Dec. 29, 2008 Non-Final Rejection.
File History for U.S. Pat. No. 7,774,280, Mar. 29, 2010 Notice of Allowance.
File History for U.S. Pat. No. 7,774,280, May 28, 2009 Applicant Response to Final Rejection.
File History for U.S. Pat. No. 8,001,053, Aug. 13, 2008 Applicant Appeal Brief.
File History for U.S. Pat. No. 8,001,053, Feb. 28, 2007 Amendment After Non-Final Rejection Response to Office Action.
File History for U.S. Pat. No. 8,001,053, Mar. 16, 2010 Supplemental Examiner's Answer to Appeal Brief.
File History for U.S. Pat. No. 8,001,053, May 17, 2010 Response to Supplemental Examiner's Answer.
Lein Harn et al., "A Software Authentication System for the Prevention of Computer Viruses", ACM, 1992.
Department of Defense Standard, "Department of Defense Trusted Computer System Evaluation Criteria" Dec. 26, 1985.
Dorothy Elizabeth Robling Denning, "Cryptography and Data Security", Addison-Wesley Publishing Company, Inc., 1982.
"Technological Strategies for Protecting Intellectual Property in the Networked Multimedia Environment", IMA Proceedings, Jan. 1994, vol. 1, Issue 1.
Decision—Denying Institution of Covered Business Method Patent Review in *Google Inc. v. ContentGuard Holdings Inc.*, CBM2015-00043, Paper 9 (Jun. 26, 2015).
Decision—Denying Institution of Inter Partes Review in *Apple Inc. v. ContentGuard Holdings Inc.*, IPR2015-00355, Paper 9 (Jun. 26, 2015).
Decision—Denying Institution of Inter Partes Review in *Apple Inc. v. ContentGuard Holdings Inc.*, IPR2015-00356, Paper 9 (Jun. 26, 2015).
Decision—Denying Institution of Inter Partes Review in *Apple Inc. v. ContentGuard Holdings Inc.*, IPR2015-00357, Paper 9 (Jun. 29, 2015).
Decision—Denying Institution of Inter Partes Review in *Apple Inc. v. ContentGuard Holdings Inc.*, IPR2015-00358, Paper 9 (Jul. 2, 2015).
Decision—Institution of Covered Business Method Patent Review in *Google Inc. v. ContentGuard Holdings Inc.*, CBM2015-00040, Paper 9 (Jun. 24, 2015).
Decision—Denying Institution of Inter Partes Review in *Apple Inc. v. ContentGuard Holdings Inc.*, IPR2015-00351, Paper 9 (Jun. 24, 2015).
Decision—Denying Institution of Inter Partes Review in *Apple Inc. v. ContentGuard Holdings Inc.*, IPR2015-00352, Paper 9 (Jun. 24, 2015).
Decision—Denying Institution of Inter Partes Review in *Apple Inc. v. ContentGuard Holdings Inc.*, IPR2015-00353, Paper 9 (Jun. 25, 2015).
Decision—Denying Institution of Inter Partes Review in *Apple Inc. v. ContentGuard Holdings Inc.*, IPR2015-00354, Paper 12 (Jul. 1, 2015).
Decision—Denying Institution of Inter Partes Review in *Apple Inc. v. ContentGuard Holdings Inc.*, IPR2015-00440, Paper 11 (Jul. 13, 2015).
Decision—Denying Institution of Inter Partes Review in *Apple Inc. v. ContentGuard Holdings Inc.*, IPR2015-00441, Paper 11 (Jul. 13, 2015).
Decision—Denying Institution of Inter Partes Review in *Apple Inc. v. ContentGuard Holdings Inc.*, IPR2015-00442, Paper 9 (Jul. 13, 2015).
Decision—Denying Institution of Inter Partes Review in *Apple Inc. v. ContentGuard Holdings Inc.*, IPR2015-00443, Paper 9 (Jul. 9, 2015).
Decision—Denying Institution of Inter Partes Review in *Apple Inc. v. ContentGuard Holdings Inc.*, IPR2015-00444, Paper 9 (Jul. 9, 2015).
Decision—Denying Institution of Inter Partes Review in *Apple Inc. v. ContentGuard Holdings Inc.*, IPR2015-00445, Paper 9 (Jul. 9, 2015).
Decision—Denying Institution of Inter Partes Review in *Apple Inc. v. ContentGuard Holdings Inc.*, IPR2015-00446, Paper 11 (Jul. 10, 2015).
Decision—Denying Institution of Inter Partes Review in *Apple Inc. v. ContentGuard Holdings Inc.*, IPR2015-00447, Paper 9 (Jul. 10, 2015).

(56) References Cited

OTHER PUBLICATIONS

Decision—Denying Inter Partes Review in *Apple Inc. v. ContentGuard Holdings Inc.*, IPR2015-00448, Paper 9 (Jul. 10, 2015).
Decision—Denying Inter Partes Review in *Apple Inc. v. ContentGuard Holdings Inc.*, IPR2015-00449, Paper 10 (Jul. 15, 2015).
Decision—Denying Institution of Inter Partes Review in *Apple Inc. v. ContentGuard Holdings Inc.*, IPR2015-00450, Paper 9 (Jun. 29, 2015).
Decision—Denying Institution of Inter Partes Review in *Apple Inc. v. ContentGuard Holdings Inc.*, IPR2015-00451, Paper 9 (Jul. 13, 2015).
Decision—Denying Institution of Inter Partes Review in *Apple Inc. v. ContentGuard Holdings Inc.*, IPR2015-00452, Paper 9 (Jul. 13, 2015).
Decision—Denying Institution of Inter Partes Review in *Apple Inc. v. ContentGuard Holdings Inc.*, IPR2015-00453, Paper 9 (Jul. 13, 2015).
Decision—Denying Institution of Inter Partes Review in *Apple Inc. v. ContentGuard Holdings Inc.*, IPR2015-00454, Paper 9 (Jul. 13, 2015).
Decision—Denying Institution of Inter Partes Review in *Apple Inc. v. ContentGuard Holdings Inc.*, IPR2015-00455, Paper 9 (Jul. 6, 2015).
Decision—Denying Institution of Inter Partes Review in *Apple Inc. v. ContentGuard Holdings Inc.*, IPR2015-00456, Paper 9 (Jun. 15, 2015).
Decision—Denying Institution of Inter Partes Review in *Apple Inc. v. ContentGuard Holdings Inc.*, IPR2015-00457, Paper 9 (Jun. 30, 2015).
Decision—Denying Institution of Inter Partes Review in *Apple Inc. v. ContentGuard Holdings Inc.*, IPR2015-00458, Paper 9 (Jul. 15, 2015).
Petition for Covered Business Method Patent Review (CBM Case No. CBM2015-00160) of U.S. Pat. No. 7,774,280 filed Jul. 17, 2015.
Decision—Institution of Covered Business Method Patent Review in *Apple Inc. v. ContentGuard Holdings Inc.*, CBM2015-00160, Paper 7 (Sep. 11, 2015).
PDF Reference (Second Edition), Adobe Portable Document Format, Version 1.3, Adobe Systems Incorporated, 1985-2000, Addison-Wesley.
Adobe Acrobat 2.0, Information Products Group, Adobe Systems Incorporated, 1994.
White, S., et al., ABYSS: A Trusted Architecture for Software Protection, IEEE (1987).
William Aspray, The Stored Program Concept, IEEE Spectrum Sep. 1990.
*ZTE Corp. and ZTE (USA) Inc. v. ContentGuard Holdings*, IPR2013-00133, Paper No. 61 (Jul. 1, 2014).

* cited by examiner

FIG. 5

```xml
<keyHolder xmlns="http://www.xrml.org/schema/2001/11/xrml2core"
  xmlns:cgXrML="http://www.xrml.org/schema/2001/11/cgXrMLSDK"
  xmlns:xsi="http://www.w3.org/2001/XMLSchema-instance"
  xmlns:dsig="http://www.w3.org/2000/09/xmldsig#"
  xsi:schemaLocation="http://www.xrml.org/schema/2001/11/xrml2core ../schema/xrml2core.xsd
  http://www.xrml.org/schema/2001/11/cgXrMLSDK ../schema/cgXrMLSDK.xsd">
  <info>
    <dsig:KeyValue>
      <dsig:RSAKeyValue>
        <dsig:Modulus>
          <cgXrML:token comment="Place holder for a value of type CryptoBinary that represents the modulus value"/>
        </dsig:Modulus>
        <dsig:Exponent>
          <cgXrML:token comment="Place holder for a value of type CryptoBinary that represents the exponent value"/>
        </dsig:Exponent>
      </dsig:RSAKeyValue>
    </dsig:KeyValue>
  </info>
</keyHolder>
```

FIG. 6

```xml
<keyHolder
  xmlns="http://www.xrml.org/schema/2001/11/xrml2core"
  xmlns:cgXrML="http://www.xrml.org/schema/2001/11/cgXrMLSDK"
  xmlns:xsi="http://www.w3.org/2001/XMLSchema-instance"
  xmlns:dsig="http://www.w3.org/2000/09/xmldsig#"
  xsi:schemaLocation="http://www.xrml.org/schema/2001/11/xrml2core ../schema/xrml2core.xsd
                      http://www.xrml.org/schema/2001/11/cgXrMLSDK
  ../schema/cgXrMLSDK.xsd">
  <info>
    <dsig:KeyValue>
      <dsig:RSAKeyValue>
<dsig:Modulus>Fa7wo6NYfmvGqy4ACSWcNmuQfbejSZx7aCiblgkYswUeTCmS0h27GJrA15SS7TYZz
SfaS0xR9IZdUEF0ThO4w==</dsig:Modulus>
        <dsig:Exponent>AQABAA==</dsig:Exponent>
      </dsig:RSAKeyValue>
    </dsig:KeyValue>
  </info>
</keyHolder>
```

FIG. 7

```
                                                                    552
<cx:digitalWork
    xmlns="http://www.xrml.org/schema/2001/11/xrml2core"
    xmlns:cx="http://www.xrml.org/schema/2001/11/xrml2cx"
    xmlns:cgXrML="http://www.xrml.org/schema/2001/11/cgXrMLSDK"
    xmlns:xsi="http://www.w3.org/2001/XMLSchema-instance"
    xmlns:dsig="http://www.w3.org/2000/09/xmldsig#"

xsi:schemaLocation="http://www.xrml.org/schema/2001/11/xrml2cx ../schema/xrml2cx.xsd
                       http://www.xrml.org/schema/2001/11/cgXrMLSDK../schema/cgXrMLSDK.xsd">
 <cx:metadata>
   <nonSecureIndirect URI="http://www.somedomain.com/metadata/XrMLUnleashed"/>
 </cx:metadata>
  <cx:locator>
    <dsig:Reference>
      <dsig:DigestMethod Algorithm="http://www.w3.org/2000/09/xmldsig#sha1"/>
      <dsig:DigestValue>qZk+NkcGgWq6PiVxeFDCbJzQ2J0=</dsig:DigestValue>
    </dsig:Reference>
  </cx:locator>
</cx:digitalWork>
```

FIG. 8

```
<issuer
 xmlns="http://www.xrml.org/schema/2001/11/xrml2core"
 xmlns:dsig="http://www.w3.org/2000/09/xmldsig#"
 xmlns:cgXrML="http://www.xrml.org/schema/2001/11/cgXrMLSDK"
 xmlns:xsi="http://www.w3.org/2001/XMLSchema-instance"
 xsi:schemaLocation="http://www.xrml.org/schema/2001/11/xrml2core ../schema/xrml2core.xsd
                     http://www.xrml.org/schema/2001/11/cgXrMLSDK ../schema/xrML SDK.xsd">
  <dsig:Signature>                                                                      <dsig:Signature>
    <dsig:SignedInfo>
      <dsig:CanonicalizationMethod Algorithm="http://www.w3.org/TR/2001/REC-xml-c14n-20010315"/>
      <dsig:SignatureMethod Algorithm="http://www.w3.org/2000/09/xmldsig#rsa-sha1"/>
      <dsig:Reference>
        <dsig:Transforms>
          <dsig:Transform Algorithm="http://www.w3.org/2000/09/xmldsig#enveloped-signature"/>
        </dsig:Transforms>
        <dsig:DigestMethod Algorithm="http://www.w3.org/2000/09/xmldsig#sha1"/>
        <dsig:DigestValue>PB4QbKOQCo941tTExbj1Q==</dsig:DigestValue>
      </dsig:Reference>
    </dsig:SignedInfo>
    <dsig:SignatureValue>AYmqOhSHbIP9.jadD2GLBweJdGzNNbwOgFDBtpRn2aeWOMGXFF9zmSaN46kyjPb7ZQAPozk8Cf5V5u9k
Qrk5QQ==</dsig:SignatureValue>
    <dsig:KeyInfo>
      <dsig:KeyValue>
        <dsig:RSAKeyValue>
          <dsig:Modulus>YPNnaeB5g7oQ2W00yzAc1T34rcnD4hre4NP7RZF11LKtdToQd0j9q9OIpgOyM4Tf8QmjXiTQkoRUTUMknAxv6q=
=</dsig:Modulus>
          <dsig:Exponent>AQABAA==</dsig:Exponent>
        </dsig:RSAKeyValue>
      </dsig:KeyValue>
    </dsig:KeyInfo>
  </dsig:Signature>
  <details>
    <timeOfIssue>2001-01-01T04:03:02</timeOfIssue>
  </details>
</issuer>
```

```
<license xmlns="http://www.xrml.org/schema/2001/11/xrml2core" xmlns:cx="http://www.xrml.org/schema/2001/11/xrml2cx"
 xmlns:sx="http://www.xrml.org/schema/2001/11/xrml2sx" xmlns:cgXrML="http://www.xrml.org/schema/2001/11/cgXrMLSDK"
 xmlns:xsi="http://www.w3.org/2001/XMLSchema-instance" xsi:schemaLocation="http://www.xrml.org/schema/2001/11/xrml2cx
 ../schema/xrml2cx.xsd http://www.xrml.org/schema/2001/11/cgXrMLSDK ../schema/cgXrMLSDK.xsd">
 <grant>
  <cgXrML:token comment="Place holder for the principal."/>          — 564
  <cgXrML:token comment="Place holder for the right."/>              — 566
  <cgXrML:token comment="Place holder for the resource."/>           — 568
  <sx:fee>
   <sx:paymentPerUse>
    <!--The currency value place holder needs to be replaced with a valid xrml2sx CurrencyCode-->
    <sx:rate currency="cgXrML:token">         — 570
     <cgXrML:token comment="Place holder for a float number value that represents the rate (cost)."/>   — 572
    </sx:rate>
   </sx:paymentPerUse>
   <sx:to>
    <!--Identifies an account within a US banking institution using conventions established by the American Banking Association.-->
    <sx:aba>
     <sx:institution>
      <cgXrML:token comment="Place holder for an ABA routing number (nine digit integer) that identifies a US banking institution."/>
     </sx:institution>
     <sx:account>
      <cgXrML:token comment="Place holder for an integer that identifies an account at a US banking institution."/>
     </sx:account>
    </sx:aba>
   </sx:to>
  </sx:fee>
 </grant>
 <cgXrML:token comment="Place holder for the issuer."/>      — 578
</license>
```

```
<license
 xmlns="http://www.xrml.org/schema/2001/11/xrml2core"   xmlns:cx="http://www.xrml.org/schema/2001/11/xrml2cx"
 xmlns:sx="http://www.xrml.org/schema/2001/11/xrml2sx"  xmlns:cgXrML="http://www.xrml.org/schema/2001/11/cgXrMLSDK"
 xmlns:dsig="http://www.w3.org/2000/09/xmldsig#"        xmlns:xsi="http://www.w3.org/2001/XMLSchema-instance"
 xsi:schemaLocation="http://www.xrml.org/schema/2001/11/xrml2cx.../schema/xrml2cx.xsd
                     http://www.xrml.org/schema/2001/11/cgXrMLSDK.../schema/cgXrMLSDK..xsd">
 <grant>
  <keyHolder>
   <info>
    <dsig:KeyValue>
     <dsig:RSAKeyValue>
      <dsig:Modulus>Fa7wo6NYfmvGqy4ACSWcNmuQfbejSZx7aCibgkYswJeTCrmS0h27GJrA15SS7TYZzSfaS0xR9lZdUEF0ThO4w==</dsig
:Modulus>
      <dsig:Exponent>AQABAA==</dsig:Exponent>
     </dsig:RSAKeyValue>
    </dsig:KeyValue>
   </info>
  </keyHolder>
  <cx:print/>  ⎯ 584
  <cx:digitalWork>
   <cx:metadata>
    <xml>
```

582 ⎯ (brace on left)
580 (label upper right)

FIG. 10B

```
</cx:simpleDigitalWorkMetadata>
    <cx:title>XrML Unleashed</cx:title>
  </cx:simpleDigitalWorkMetadata>
</xml>
  </cx:metadata>
  <cx:locator>
    <nonSecureIndirect URl="http://www.contentguard.com/xrmlUnleashed.spd"/>
  </cx:locator>
</cx:digitalWork>
<sx:fee>                588
  <sx:paymentPerUse>
    <sx:rate currency="USD">2.00</sx:rate>
  </sx:paymentPerUse>
  <sx:to>                590
    <sx:aba>
      <sx:institution>139371581</sx:institution>
      <sx:account>111111</sx:account>
    </sx:aba>                592
  </sx:to>
</sx:fee>
</grant>
```

```
<issuer xmlns="http://www.xrml.org/schema/2001/11/xrml2core" xmlns:dsig="http://www.w3.org/2000/09/xmldsig#"
xmlns:cgXrML="http://www.xrml.org/schema/2001/11/cgXrMLSDK" xmlns:xsi="http://www.w3.org/2001/XMLSchema-instance"
xsi:schemaLocation="http://www.xrml.org/schema/2001/11/xrml2cx .../schema/xrml2cx.xsd http://www.xrml.org/schema/2001/11/cgXrMLSDK
.../schema/cgXrMLSDK.xsd">
  <dsig:Signature>
    <dsig:SignedInfo>
      <dsig:CanonicalizationMethod Algorithm="http://www.w3.org/TR/2001/REC-xml-c14n-20010315"/>
      <dsig:SignatureMethod Algorithm="http://www.w3.org/2000/09/xmldsig#sa-sha1"/>
      <dsig:Reference>
        <dsig:Transforms>
          <dsig:Transform Algorithm="http://www.w3.org/2000/09/xmldsig#enveloped-signature"/>
        </dsig:Transforms>
        <dsig:DigestMethod Algorithm="http://www.w3.org/2000/09/xmldsig#sha1"/>
        <dsig:DigestValue>PB4QbKOQCo941tTExbj1/Q==</dsig:DigestValue>
      </dsig:Reference>
    </dsig:SignedInfo>
    <dsig:SignatureValue>AYmqOhSHbiP9JadD2GLBweJdGzNNbwOgFD8tpRn2aeW0MGXFF9zmSaN46kyiPb7ZQAPozk8Cf5V5u9kQrk5QQ==</dsig:SignatureValue>
    <dsig:KeyInfo>
      <dsig:KeyValue>
        <dsig:RSAKeyValue>
          <dsig:Modulus>YPNnae05g7cQ2W00yzAc1T34rcnD4hreANP7RZF11LKtdToQd0j9qeOtpQyM4Tf8QmjXiTQkoRUTUMknAxv6q==</dsig:Modulus>
          <dsig:Exponent>AQABAQ==</dsig:Exponent>
        </dsig:RSAKeyValue>
      </dsig:KeyValue>
    </dsig:KeyInfo>
  </dsig:Signature>
  <details>
    <timeOfIssue>2001-01-01T04:03:02</timeOfIssue>
  </details>
</issuer>
<licence.
```

FIG. 11

```xml
<license xmlns="http://www.xml.org/schema/2001/11/xml2core" xmlns:cx="http://www.xml.org/schema/2001/11/xml2cx"
xmlns:sx="http://www.xml.org/schema/2001/11/xml2sx" xmlns:cgXML="http://www.xml.org/schema/2001/11/cgXMLSDK"
xmlns:xsi="http://www.w3.org/2001/XMLSchema-instance" xsi:schemaLocation="http://www.xml.org/schema/2001/11/cgXMLSDK.../schema/cgXrMLSDK.xsd http://www.xml.org/schema/2001/11/xml2cx
.../schema/xml2cx.xsd http://www.xml.org/schema/2001/11/cgXMLSDK.../schema/cgXrMLSDK.xsd">
  <grant>
    <cgXrML:CGTOKEN TOKENNAME="Principal" comment="Place holder for the principal."/>
    <cgXrML:CGTOKEN TOKENNAME="Right" comment="Place holder for the right."/>
    <cgXrML:CGTOKEN TOKENNAME="Resource" comment="Place holder for the resource."/>
    <sx:fee>
      <sx:paymentPerUse>
        <!--The currency value place holder needs to be replaced with a valid xrml2sx CurrencyCode-->
        <sx:rate currency="CGTOKEN:RateCurrency:CGTOKEN">
          <cgXrML:CGTOKEN TOKENNAME="RateCost" comment="Place holder for a float number value that represents the rate (cost)."/>
        </sx:rate>
      </sx:paymentPerUse>
      <sx:to>
        <!--Identifies an account within a US banking institution using conventions established by the American Banking Association.-->
        <sx:aba>
          <sx:institution>
            <cgXrML:CGTOKEN TOKENNAME="InstitutionRoutingNumber" comment="Place holder for an ABA routing number (nine digit integer) that identifies a US banking institution."/>
          </sx:institution>
          <sx:account>
            <cgXrML:CGTOKEN TOKENNAME="AccountNumber" comment="Place holder for an integer that identifies an account at a US banking institution."/>
          </sx:account>
        </sx:aba>
      </sx:to>
    </sx:fee>
  </grant>
  <cgXrML:CGTOKEN TOKENNAME="Issuer" comment="Place holder for the issuer."/>
</license>
```

FIG. 14A

```
KeyHolder
IGNORE_TOKEN (keys)
End KeyHolder
```

FIG. 14B

```
PassportUser
IGNORE_TOKEN (certificate)
End PassportUser
```

FIG. 14C

```
Play
End Play
```

FIG. 14D

```
Print
End Print
```

FIG. 14E

```
Save
End Save
```

FIG. 14F

```
DigitalResource
IGNORE_TOKEN (URL)
End DigitalResource
```

FIG. 14G

```
WebService
IGNORE_TOKEN (uddiServiceKey)
End WebService
```

FIG. 14H

```
FlatFee
IGNORE_TOKEN (rate)
End FlatFee
```

FIG. 14I

```
ValidityInterval
IGNORE_TOKEN (timeRange)
End ValidityInterval
```

SYSTEMS AND METHODS FOR CREATING, MANIPULATING AND PROCESSING RIGHTS AND CONTRACT EXPRESSIONS USING TOKENIZED TEMPLATES

RELATED APPLICATION DATA

This application claims priority to U.S. provisional application Ser. No. 60/331,619 filed Nov. 20, 2001, Ser. No. 60/331,622 filed Nov. 20, 2001, Ser. No. 60/359,646 filed Feb. 27, 2002, and Ser. No. 60/359,661 filed Feb. 27, 2002, all of which are incorporated herein by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Field of the Invention

The present invention relates generally to a rights expression manipulation system. In particular, the present invention is directed to systems and methods for creating, modifying, parsing, interpreting and validating licenses and/or rights expressions statements using templates which may or may not include tokens.

Discussion of the Related Art

Electronically distributing resources or content is developing into a lucrative industry. The term "content" is used broadly herein and includes digital works, such as music, audio files, text files, books, reports, video, multimedia, pictures, executable code, or any combination thereof. Controlling access to content is important when distributing them over inherently insecure networks and infrastructures, such as the Internet, although access control may be also desired in other settings. Failure to control resource access can result in unabated intellectual property right infringement and unrealized profits resulting from lost potential sales. Systems have been developed to help reduce these losses thereby enabling content owners to protect and profit from their digital content. Such systems are utilized to specify the usage rights for content or other things and to enforce the usage rights.

Various implementations of Rights Management Systems and rights associated with digital content are known as disclosed by U.S. Pat. No. 5,629,980, No. 5,634,012, No. 5,638,443, and No. 5,715,403. Hence, the details of Rights Management Systems are not discussed specifically herein. As evident from these references, a Rights Management system can take many forms, and can employ varying levels of complexity depending on the security required, the nature of the thing being managed, the complexity of associated rights and conditions, volume and other factors. For example, Rights Management systems have been used to enable the secure distribution of digital media content over the Internet. Examples of such systems and associated paradigms are Pay-per-view, Subscription, and Superdistribution, as well as others. A Pay-per-view paradigm may require the user to pay a fee each time content is viewed. A Subscription paradigm may allow subscribers who pay monthly to download a number of songs per month. A Superdistribution paradigm may encourage the free and widespread distribution of digital content, such as audio or video clips, that can only be opened a limited number of times.

FIG. 1 illustrates an exemplary rights management (RM) system 100 and the associated workflow that can be used to distribute digital content. Typically, when a user goes through an activation process, information is exchanged between activation server 102 and client application 106, and is downloaded and installed in client application 106. Client application 106 serves as a tamper resistant security component and contains the set of public and private keys 104 that are issued by activation server 102 as well as other components such as any necessary engine for parsing or rendering protected content 108.

The RM system 100 also includes a content preparation application 103 that protects clear content 101 through encryption or other protective mechanisms to thereby provide protected content 108. The content preparation application 103 also specifies usage rights in a rights label 110 that is associated with protected content 108. The rights label 110 specifies usage rights that are available to an end-user when corresponding conditions are satisfied. A rights expression language ("REL"), such as XrML™, may be used to specify the rights and conditions set forth in the rights label 110. The rights label 110 and the appropriate encryption key that was used to encrypt the clear content 101 is then provided to the license server 112.

The license server 112 manages the encryption keys and issues license 114 that allows exercise of usage rights. For example, rights label 110 may include usage rights for viewing protected content 108 upon payment of a fee of five dollars, and viewing or printing protected content 108 upon payment of a fee of ten dollars. Client application 106 interprets and enforces the usage rights that have been specified in license 114 to provide clear content 116 that may be used by the end user.

The components and modules of the RM system 100 can be located in one or more than one device. For example, the activation server 102 and the license server 112 could be the same server or other device, or plural separate devices. The protected content 108 may be any type of content including a document, image, audio file, video file, etc. Further details of RM systems are set forth in further detail in the references noted above, and consequently, are not discussed specifically herein.

Thus, RM systems not only protect content, but also enable content owners to manage the sale and use of their content by means of licenses. Licenses include rights expressions written in a REL for articulating usage rights and to associate usage rights to content. Licenses may be specified for different stages during the life cycle of digital content. For example, when digital content is released to a distributor, licenses may be specified by content owners to limit distribution of the digital content to a particular region or a period of time, or to restrict how content may be repackaged. Of course, licenses themselves must be protected as well since they are a controlling facet determinative of how content is used. In this regard, licenses are typically digitally signed by the issuers so that their integrity and authenticity may be verified before being interpreted.

A license typically includes a grant element, a principal element, a right element, a resource element, and optionally, a condition element. In particular, a license contains one or more grant elements which defines the details of the usage rights granted. The one or more grant elements may specify a principal element, a rights element, a resource element and, optionally, a condition element. The principal element identifies a principal, such as a user, or a group of principals who is/are granted the right to access or use the protected resources, while the rights element names a specific right (e.g., play, view, print, execute, copy) to be given to the principal with regards to accessing or using the protected resources. The resource element specifies the protected resources, and the optional condition element specifies any conditions that are imposed on the right to use the protected resource.

A license is typically embodied as a rights expression. A rights expression is a syntactically and semantically correct language construct, based on a defined grammar, to convey rights information. As noted, an example of an REL is XrML™. It is important to note that the term "rights expression," as used herein, should not be limited to licenses in particular, but refers to any expressions that may be used by the RM system to convey information. Thus, the term "rights expression" and derivatives thereof as used herein generally refers to expressions of licenses, license components and/or fragments, such as the grant element, principal element, right element, resource element, and/or condition element described above, as well as any other appropriate expressions. Moreover, rights expressions may be in a variety of different forms ranging from binary encoded sequences that target resource constrained applications to multi-level REL constructs that describe complex rights information for managed distribution of digital resources and rights granting paradigms, and including representations by symbols, objects, colors or other representations that are undetectable by human senses but which can be detected by machines.

SUMMARY OF THE INVENTION

A first aspect of the invention is a system for manipulating rights expressions for use in connection with a rights management system. The system comprises a license template module that creates one or more license templates, the license templates each having one or more rights expression statements. The rights expression statements each have one or more first tokens associated therewith, at least one of the first tokens being a place holder for one of a plurality of data items. A license instance creation module replaces at least one of the first tokens in one or more selected license templates with one or more of the data items to generate a license instance. A license instance analysis module compares one or more portions of the license instance with one or more of the license templates to find at least one portion of the license instance which corresponds to at least one of the license templates. The license instance analysis module provides a result set indicating whether at least one corresponding license template exists.

BRIEF DESCRIPTION OF THE DRAWINGS

FIG. 5 illustrates a keyholder template of an embodiment.

FIG. 6 is an illustration of an example of a rights expression in accordance with the preferred embodiment.

FIG. 7 is an illustration of an example of a rights expression in accordance with the preferred embodiment.

FIG. 8 is an illustration of an example of a rights expression in accordance with the preferred embodiment.

FIG. 9 is an illustration of an example of a rights expression in accordance with the preferred embodiment.

FIG. 10 is an illustration of an example of a rights expression in accordance with the preferred embodiment.

FIG. 11 is an illustration of an example of a rights expression in accordance with the preferred embodiment.

FIGS. 14A-14I are template fragment examples in a pseudo rights expression grammar.

DETAILED DESCRIPTION OF THE INVENTION

Rights Management ("RM") systems can be applied to digital content and other items, such as services, goods, and the like. For example, rights and conditions can be associated with any physical or non-physical thing, object, class, category, service, or other items for which access, distribution, execution, or other use is to be controlled, restricted, recorded, metered, charged, monitored or otherwise managed in some fashion. Thus, a RM system can be used, for example, to specify and enforce usage rights and condition for any item such as content, service, software program, goods etc. To extend the concept of rights management to tangible items, an item ticket can be used to associate usage rights with the item. A license or other rights expression is associated with the item ticket 200, illustrated in FIG. 2, through a ticket specification that points to or otherwise indicates the item ticket. The item ticket 200 can be protected with some crypto algorithm or other mechanism for preventing processing or rendering of item ticket 200 except in accordance with an associated license. The item ticket 200, with the security mechanism unlocked, can be a human readable or computer readable coupon, a code, a document, or the like. Accordingly, the phrase "item ticket" refers to any tangible or intangible indication of an item. The item ticket specifies one or more items and thus, usage rights and conditions can be associated with any item including, objects, classes, categories, and services, for which use, access, distribution, or execution is to be controlled, restricted, recorded, metered, charged, monitored, or otherwise managed in some fashion as previously noted.

Figure 1:
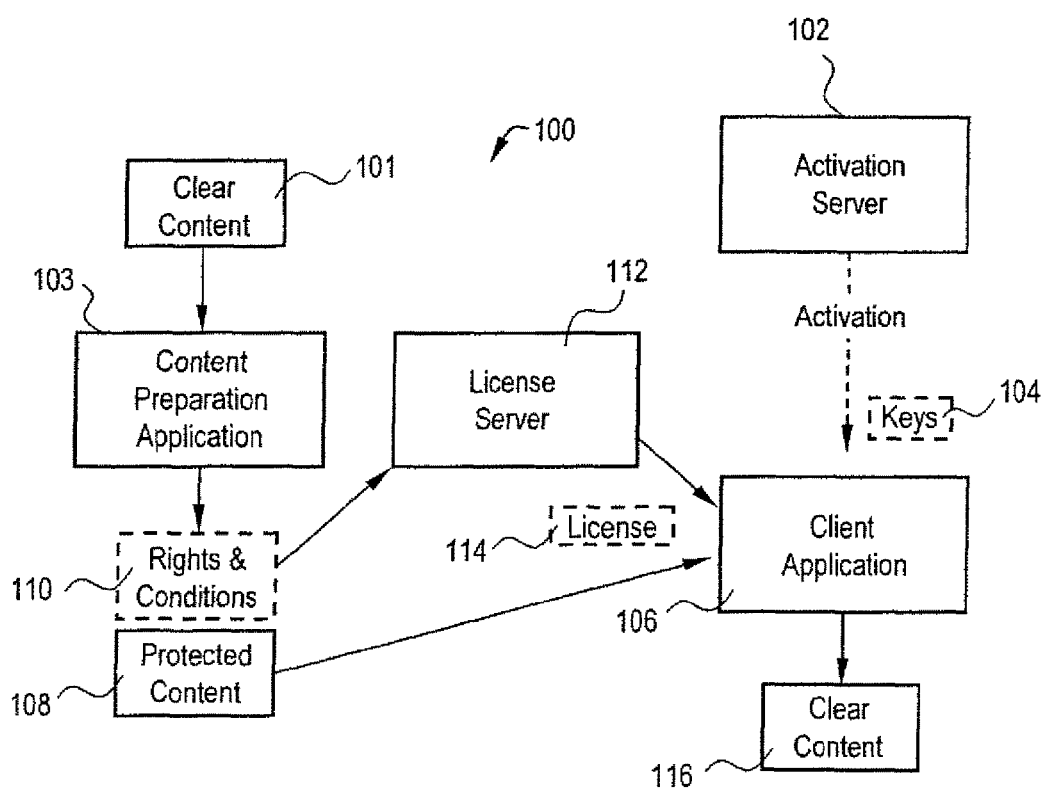
FIG. 1 is a schematic illustration of a Rights Management system.
Figure 2:
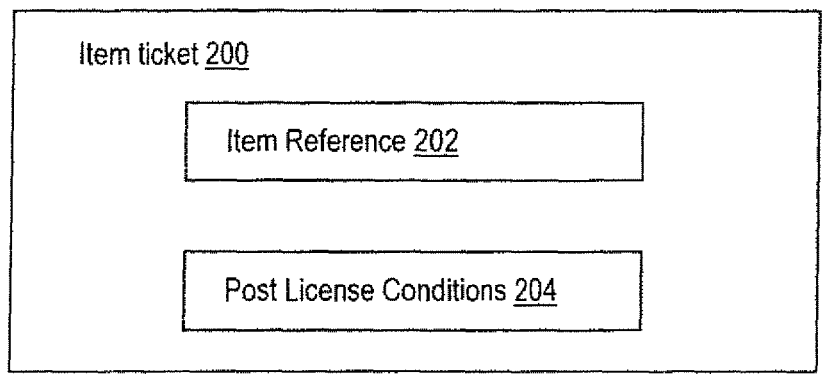
FIG. 2 is a schematic illustration of an item ticket.

As illustrated in FIG. 2, the item ticket 200 can be prepared by specifying an item reference 202 and any post license conditions 204 that restrict redemption of the item ticket 200. The item ticket 200 can be linked to the item through the item reference 202. The term "linked" as used herein refers to any type of association, such as a description, a pointer, or the like. For example, the item ticket 200 can include a unique code associated with an item through a database record. When the code is presented to a vendor, the database is searched and the corresponding item can be delivered. Item ticket 200 can also include a human readable description of the item and any post license condition 204 not yet satisfied such as certain location or time the item ticket 200 may be redeemed. Access to the item 200 can be controlled using a license in the manner described above with respect to content. Further details of Rights Management systems utilizing item tickets are disclosed in U.S. application Ser. No. 10/159,272 entitled METHOD AND APPARATUS FOR DISTRIBUTING ENFORCEABLE PROPERTY RIGHTS that was filed on Jun. 3, 2002, the disclosure of which is incorporated herein by reference.

Regardless of the details of the item, and whether the item is digital content, an object, a class, a category, a service, or other items, the task of manipulating licenses and/or rights expressions statements associated with the licenses which are written in a rights expression language ("REL") is complicated and difficult. It is important to note that the term "manipulating" and derivatives thereof as used herein generally refers to creating, modifying, parsing, interpreting and validating licenses and/or rights expressions statements.

The flexibility and wide coverage that comprehensive RELs provide for forming licenses, for example, is attained at a cost, namely an increased level of complexity involved in implementing RM systems based on RELs. Additionally, the adoption of RELs has been hindered because of the learning curve and the difficulty involved in interacting with a REL. REL based systems require system administrators to understand the semantics and syntax of the particular REL upon which the system is based. Conventional approaches for the manipulation, validation and/or interpretation of rights expressions written in an REL typically involves the use of an expression processor or parser, such as an XML parser, for example. Such parsers provide tremendous power of generality and flexibility in the manipulation of REL expressions.

In particular, typical parsers provide a systematic representation of the rights expressions and often include a mechanism, such as a programmatic interface, which can be utilized by system administrators to interact with the parser to perform data extraction, expression validation and other manipulation functions, such as read, write, and modification of the REL expressions. One of perhaps many problems associated with these parsers is the lack convenience when they are used as a tool for direct manipulation and/or interpretation of rights expressions, which are bounded not only by language syntax but by semantics defining rights information as well. As mentioned above, the system administrators must understand the REL expressions.

For example, XrML is an XML-compliant REL. An XML parser is capable of manipulating any well-formed XML expressions, such as XrML rights expressions. But using an XML parser to directly create and modify XrML expressions, for example, is not convenient. Here, the user would need to fully comprehend XrML from both a syntactic and a semantic perspective, and use that knowledge to directly manipulate the expressions at a very granular level (e.g., the element and attribute levels). From an interpretation aspect, a conventional XML parser does not have the capability of extracting the semantics of a rights expression, since it merely provides a programmatic interface to the syntax used in the expressions as noted above. From a validation perspective, although standard parsers usually provide some limited validation mechanisms, they often demand too many system resources to be able to function properly in some operating system environments.

Thus, rights expression manipulating systems and methods should preferably enable users to easily create, modify, validate, parse and interpret rights expressions without requiring detailed knowledge of an REL. Further, these systems should be lightweight and be sufficiently robust so that they can operate in a variety of system architectures and environments while minimizing the amount of system resources needed to function. Consequently, it is desirable to provide license templates and/or template fragments for use with rights expression manipulating systems and methods configured to handle these templates, as set forth herein, where the templates includes rights expression statements and optionally further include tokens associated with at least one of the rights expression statements.

The manipulation systems and methods of the present invention uses these token-less or tokenized templates to easily create well-formed, valid licenses or license fragments. Where templates are tokenized, the tokens can be placeholders for data of all complexities, from extremely primitive data, like a string or an integer, to extremely complicated rights expression fragments that can be generated using other templates and then passed in as token values into parent templates. Users with little or no knowledge of an REL can easily generate complex rights expressions in seconds without having to worry whether the syntax or semantics are correct. On the developmental side, they greatly reduce the amount of code that needs to be explicitly written to create rights expressions. Additionally, tokenized templates allows for the creation of a generic and lightweight rights expression creation system that can be used to quickly and easily process rights expressions for any business model.

Further, these systems and methods can use templates to allow licenses, whether initially created using these templates or not, to be easily modified, validated, parsed and interpreted. It should be appreciated that the systems and methods of the present invention should not be limited to applications in RM systems, but may be implemented in a variety of environments where an authorization policy structure is employed, including Digital Rights Management Systems, B2B and B2C Contract infrastructures, Web Service Access Management Systems, and Software Function and Object Access Management Systems, for example.

Figure 3:
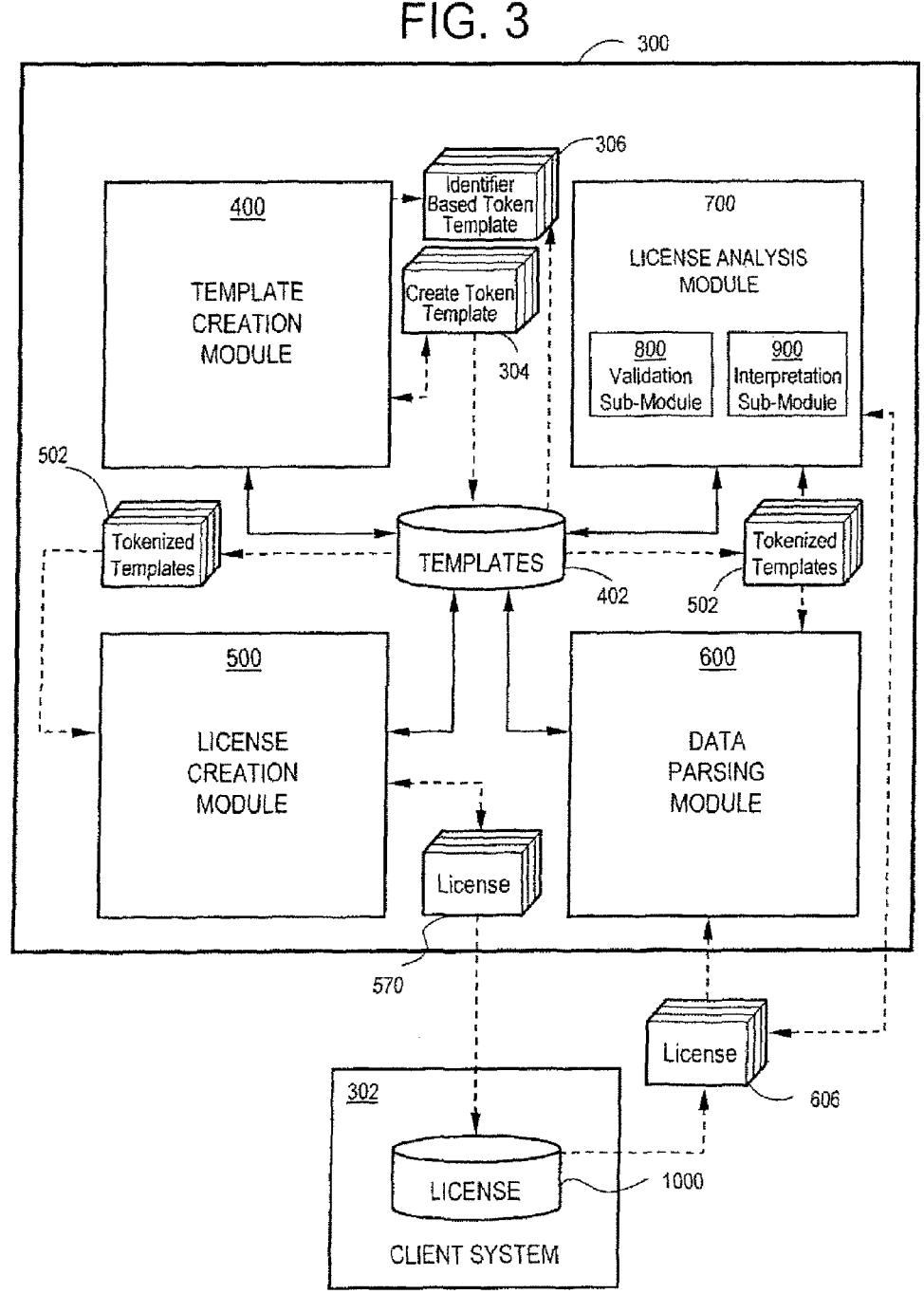
FIG. 3 is a functional block diagram of an exemplary rights management system of the preferred embodiment.

FIG. 3 shows a functional block diagram of a rights expression manipulation system 300 that enables rights expressions to be easily created, modified, validated, parsed and interpreted without requiring detailed knowledge of an REL. In embodiments of the present invention, the right expression manipulation system 300 is at least capable of processing documents written in a rights expression language, such as an XML based right expression language (e.g., XrML), although the system 300 is capable of processing other types of rights expression languages.

It should be initially noted that whereas the illustrated embodiment is referred to herein as a rights expression manipulation system 300, the present invention may be implemented in any system or device. In this regard, the rights expression manipulation system 300 may be implemented with any type of hardware and software, and may be implemented using a pre-programmed general purpose computing device. For example, the rights expression manipulation system 300 may be implemented using a personal computer, a portable computer, a thin client, a cell phone, a PDA, a vending machine, or any other device or combination of devices. In embodiments where the system 300 is implemented as software functioning on a general purpose computer, a number of programming languages may be used to configure the system 300 to function as described herein, such as C, C++, Pascal, Assembly language, machine language, JAVA, Smalltalk, CLOS, Ada, or Object Pascal. In embodiments where the rights expression system 300 is implemented as a hardware component, the system 300 may comprise circuitry hard-wired or configured to operate in the manner described herein.

The rights expression manipulation system 300 and its associated modules, sub-modules, and memory storages, may be implemented on a single device or as a software component at a single location, or multiple devices or software components at a single or multiple locations, which are connected together using any appropriate communication protocols over any communication medium, such as electric cable, fiber optic cable or any other cable, or in a wireless manner using radio frequency, infrared, or other technologies. Where one or more individual modules and/or sub-modules of the system 300 are implemented as software methods, procedures, functions, applets, or separate programs or applications, a number of means or protocols may be utilized for the modules to communicate with each other, the system 300, and the client 302, such as Common Object Request Broker Architecture ("CORBA"), Remote Method Invocation ("RMI") and Simple Object Access Protocol ("SOAP").

It should also be noted that the rights expression processing system 300 in accordance with embodiments of the present invention is illustrated and discussed herein as having a plurality of modules and sub-modules which perform particular functions. These modules and sub-modules are merely schematically illustrated based on their function for exemplary and clarity purposes only, and do not necessarily represent specific hardware or software. As mentioned above, these modules may be hardware and/or software implemented to substantially perform the particular functions explained. Moreover, two or more of these modules may be combined together within the rights expression manipulation system 300, or divided into additional modules and/or sub-modules based on the particular function or result desired and/or the particular requirements of the environment they reside in. As such, the present invention as embodied in FIG. 3 should not be construed to limit the rights expression manipulation system 300 of the present invention or its associated modules.

In the illustrated embodiment, the rights expression processing system 300 includes a template creation module 400, a license creation module 500, a license analysis module 600, and a data parsing module 900. Each of these modules and their associated functions will be described in further detail herein below. Also in this embodiment, a client system 302 is connected to the rights expression processing system 300 using any of the techniques described above, and hence the client 302 may communicate with the modules 400, 500, 600, 900, and any sub-modules thereof, in the manner described and illustrated herein in accordance with embodiments of the present invention. While the rights expression manipulation system 300 and the client system 302 are shown and described herein as being situated in separate locations, it should be appreciated that the client 302 may be an application or module residing and operating within the rights expression system 300 or residing and operating on the same device as the system 300.

An embodiment of the system 300 for creating templates will now be described with reference to FIG. 3. In this embodiment, the template creation module 400 is communicatively coupled to a template storage 402, which stores one or more templates 304, 306 created by the module 400, as described further herein below. The template storage 402 may be logically organized as a relational database that is stored in a memory in the rights expression processing system 300, although other storage configurations may be utilized.

The operation of the system 300 for creating templates will now be described. A user of the rights management system 300, such as a system administrator, for example, using an interface implemented by the system 300 or in communication therewith, such as a word processing program or a standard text editor, creates a text file representing the content for each of the templates 304, 306, as described herein, although all the templates could be stored together in one combined file or one or more data structures. Once the textual content that constitutes each of the templates 304, 306 is completed, the template creation module 400 stores the templates 304, 306 in the template storage 402 for further processing as described and illustrated herein in accordance with embodiments of the invention. It should be noted that the templates 304, 306, as described herein, are expressed using textual content for ease of discussion and illustration. As such, it should be appreciated that templates may be expressed in a variety of other formats, such as any computer-readable format (e.g., binary code) or human-readable format (e.g., MS Word™ document). Templates can be created using known techniques, tools, and editors.

Tokenized templates 304, 306 will now be described in accordance with another embodiment of the present invention, with continued reference to FIG. 3. Generally, templates 304, 306 are licenses or license fragments (i.e., elements) that optionally include one or more tokens for use in creating and/or enforcing rights expressions, among other things. The templates are created based upon common business models, although they can be mixed, matched and modified as described further here. Moreover, real world examples are provided further herein below for exemplary purposes. When templates 304, 306 include one or more tokens, these tokens serve a variety of functions, such as indicating to the rights expression manipulation system 300 that a token should be replaced with information specific to the grants that a user wishes to issue, or indicating to the system 300 where specific values or other tokens should be placed or extracted from, or what values should be ignored during processing (e.g., validation, interpretation, data parsing), all of which will be described further herein below in accordance with embodiments of the invention.

Accordingly, one or more types of templates, such as a general token template 304, and an identifier based token template 306, are created, although different types and subtypes of tokenized templates are possible as will be evident to one skilled in the computer science and rights management arts upon a review of this disclosure. Moreover, the types of tokens described herein are merely exemplary and are simply intended to convey to an artisan of ordinary skill the flexibility and broad range of configurations that the tokens may embody, and are therefore not intended to be limiting in any way.

As such, the general tokenized templates 304 each include one or more general tokens and the identifier based tokenized templates 306 each include one or more identifier based tokens, although again, one or more of the templates 304, 306 do not necessarily need to have any tokens. The rights expression manipulation system 300 is configured as appropriate to be able to process each type of template as mentioned above and described in further detail herein. In embodiments of the present invention, the templates 304, 306 are written in an XML based rights expression language (e.g., XrML), although a number of other known or later developed XML or non-XML based rights expression languages may be utilized. Moreover, the templates 304, 306 are each well-formed XML documents which assist the rights expression manipulation system 300 to process the templates 304, 306 as described herein. The different types of tokens mentioned above (i.e., identifier based and general tokens) used in the templates 304, 306 will now be described in accordance with embodiments of the present invention, beginning with the general tokens.

In this embodiment, a general identifier is used to represent each of one or more tokens within the general tokenized templates 304. Further, there are one or more subtypes of general tokens, such as an element general token and an attribute general token. The subtypes will be described herein, beginning with the element type general token. Thus, in this embodiment the general tokens within each of the templates 304 appear the same, except as described herein. For example, template 304 may include a token which is denoted as "cgXrML:token." In this example, the element "<cgXrML:token comment="A token"/>" within a template 304 serves as an element node placeholder. In embodiments of the invention, the terms "element" and "element node," and derivatives thereof, are used interchangeably. The existence of "cgXrML:token" indicates that this entire element node (i.e., "<cgXrML:token comment="A token"/>") is a token that is subject to substitution or some other operation. Element tokens can be replaced with another element node (e.g., an XML element) or a string, since element tokens can be placeholders for elements and element values as mentioned above. The "comment" attribute can be used to indicate to the rights expression manipulation system 300 the type of value that should replace the token, for example, during license creation.

Another subtype of the general tokens described herein that may be included in general tokenized templates 304 are attribute tokens. Attribute tokens included in a template 304 indicate to the rights expression manipulation system 300 that a value should be substituted for the attribute, for example. The value may be substituted for a portion of the attribute's value or for the entire value. For example, the syntax for an attribute token in a template 304 could be "<namespace:element attribute="cgXrML:token"/>". In this example, the token "cgXrML:token" is the only descriptor in the attribute's string value. The rights expression manipulation system 300 is configured to interpret an occurrence of "cgXrML:token" within an attribute's string value as being an attribute token. Alternatively, the syntax for an attribute token in a template 304 could be "<namespace:element attribute="ISBN#cgXrML:token"/>", where only a portion of the attribute's string value is desired to be replaced. As can be seen in the alternative example, the attribute token (i.e., cgXrML:token) forms a portion of the entire attribute's string value, since the "ISBN#" value is present in the string. Thus, during license creation, for example, which will be described in further detail below, the rights expression manipulation system 300 will substitute a value for just the "cgXrML:token" token and will not affect other text, such as the "ISBN#" value, within the attribute's string value. For example, passing in the value of "1234" for the token during license creation would result in the following: "<namespace:element attribute="ISBN#1234"/>". Unlike the element tokens described above, only strings are accepted as values for attribute tokens.

An exemplary partial template with general tokens (e.g., element and attribute tokens) is provided below:

```
<dsig:Reference URI="cgXrML:token">
    <dsig:DigestMethod Algorithm="cgXrML:token"/>
    <dsig:DigestValue>
        <cgXrML:token comment="Place holder for a value of type
        DigestValueType that represents the DigestValue"/>
```

-continued

```
    </dsig:DigestValue>
</dsig:Reference>
```

The first token in the example above, "<dsig:Reference URI="cgXrML:token">", and the second token, "<dsig:DigestMethod Algorithm="cgXrML:token"/>", serve as placeholders for attribute values within the string portions of the tokens. Thus, the rights expression manipulation system 300 is configured to replace the first token with the value of a URI attribute and the second token with the value of an Algorithm attribute during license creation, for example. The third token, "cgXrML:token comment="Place holder for a value of type DigestValueType that represents the DigestValue"/>" is an element token. In this example, the third token serves as a placeholder for the value of the "dsig:DigestValue element."

The general tokens described above (e.g., element and attribute tokens) for inclusion in one or more of the general tokenized templates 304 may be modified to have a token definition for each type of token when multiple types of tokens are desired. As will be discussed further herein below in connection with one or more embodiments of the present invention, in some circumstances it may be desirable to have tokens in a template 304 that should be substituted for actual values or other tokens, and tokens that should be ignored by the rights expression manipulation system 300 when performing certain processes, such as license interpretation or validation. For instance, an element token that should be ignored by the rights expression manipulation system 300 may be defined as "<cgXrML:ignore_token comment="A token"/>". An element token that should be substituted for a value or another element by the manipulation system 300 may be defined as "<cgXrML:sub_token comment="A token"/>". An attribute token that should be ignored by the rights expression manipulation system 300 may be defined as "<namespace:element attribute="cgXrML:ignore_token"/>". And an attribute token that should be substituted for a value by the manipulation system 300 may be defined as "<namespace:element attribute="cgXrML:sub_token"/>".

A unique identifier can be used to represent each of one or more tokens within the identifier based tokenized templates 306 so that each particular token can be identified by the rights expression manipulation system 300 during processing as described further herein below, although again, templates 306 do not necessarily need to have any tokens. This may help avoid any problems that may be faced by the manipulation system 300 when using the above-described general tokenized templates 304, such as requiring that an ordered input list containing element or attribute general tokens be provided to the rights expression manipulation system 300. Further, as in the case of general tokens described above, there are one or more subtypes of identifier based tokens, such as an element and an attribute identifier based token. Each type will be described herein, beginning with the element type identifier based token.

The identifier based tokenized template 306 may include a token that is denoted as "<cgXrML:CGTOKEN TOKENNAME="tokenName" comment="A token"/>", which provides element and element value placeholders for the manipulation system 300 to perform particular functions. The "TOKENNAME" attribute is used to indicate a name or an identifier for that particular token. The "comment" attribute is used to indicate to the rights expression manipulation system 300 what should replace the token, such as another token or a value. The existence and positioning of "cgXrML: CGTOKEN" within the token indicates to the system 300 that this entire element node is a token that is subject to substitution for another token or a value during some processing, for example. Again, element tokens can be replaced with an element node (e.g., XML element) or a string, since element tokens can be placeholders for elements and element values.

Another subtype of identifier based token that may be included in identifier based tokenized templates 306 are attribute identifier based tokens, which are different from the identifier based element tokens described above. Attribute tokens included in a template 306 indicate to the rights expression manipulation system 300 that a value should be substituted for the attribute. The value may be substituted for a portion of the attribute's value or for the entire value. For example, the syntax for an identifier based attribute token in a template 306 could be "<namespace:element attribute="CGTOKEN:tokenName:CGTOKEN"/>". In this example, the token "CGTOKEN:tokenName:CGTOKEN" is the only descriptor in the attribute's string value. The rights expression manipulation system 300 can be configured to interpret any occurrence of "CGTOKEN:tokenName:CGTOKEN" within an attribute's string value as being an attribute token during processing. Alternatively, the syntax for an attribute token in a template 306 could be "<namespace:element attribute="ISBN# CGTOKEN:tokenName:CGTOKEN"/>", where only a portion of the attribute's string value is desired to be replaced. As can be seen, the attribute token forms only a portion of the entire attribute's string value. Thus, during license creation, for example, which will be described in further detail below, the rights expression manipulation system 300 will substitute a value for just the "CGTOKEN:tokenName:CGTOKEN" token and will not change any other text (i.e., "ISBN#") within the attribute's string value. For example, passing in the value of "1234" for the token during license creation would result in the following: "<namespace:element attribute="ISBN#1234"/>". Unlike the general element tokens described above, only strings are accepted as values for attribute tokens.

An exemplary partial template with identifier based tokens (e.g., element and attribute tokens) is provided below:

```
<dsig:Reference URI="CGTOKEN:URI:CGTOKEN">
    <dsig:DigestMethod
    Algorithm="CGTOKEN:Algorithm:CGTOKEN"/>
    <dsig:DigestValue>
        <cgXrML:CGTOKEN TOKENNAME="DigestValue"
        comment="Place holder for a value of type DigestValueType
        that represents the DigestValue"/>
    </dsig:DigestValue>
</dsig:Reference>
```

The first token in the example above, "<dsig:Reference URI="CGTOKEN:URI:CGTOKEN">", and the second token, "<dsig:DigestMethod Algorithm="CGTOKEN:Algorithm:CGTOKEN"/>", represent the string version of a token and serve as placeholders for attribute values. Thus, the rights expression manipulation system 300 is configured to replace the first token, as identified by its identifier (i.e., URI), with the value of the URI attribute during license creation, and the second token, as identified by its identifier (i.e., Algorithm), with the value of the Algorithm attribute. The third token, "<cgXrML:CGTOKEN TOKENNAME="DigestValue" comment="Place holder for a value of type DigestValueType that represents the DigestValue"/>", is an element token. In this example, the third token serves as a placeholder for the value of the "dsig: DigestValue element" and can be located by the system 300 using the identifier (i.e., DigestValue).

As described above in connection with the general tokens (i.e., element and attribute tokens), the identifier based tokens (i.e., element and attribute tokens) for inclusion in one or more of the identifier based tokenized templates 306 may also be modified to have a definition for each type of token when multiple types of tokens are desired, with identifier attributes identifying each definition. As will be discussed further herein below in connection with one or more embodiments of the present invention, in some circumstances it may be desirable to have tokens in a template 306 that should be substituted for values or other tokens, and tokens that should be ignored by the rights expression manipulation system 300 when performing some processes, such as license interpretation or validation. For example, an element token that should be ignored by the rights expression manipulation system 300 during some processing may be defined as "<cgXrML:CG_IGNORE_TOKEN TOKENNAME="tokenName" comment="A token"/>". An element token that should be substituted for another element or a value by the manipulation system 300 during some processing may be defined as "<cgXrML:CG_SUB_TOKEN TOKENNAME="tokenName" comment="A token"/>". An attribute token that should be ignored by the rights expression manipulation system 300 may be defined as "<namespace:element attribute="CG_IGNORE_TOKEN:tokenName:CG_IGNORE_TOKEN"/>". And an attribute token that should be substituted for a value by the manipulation system 300 may be defined as "<namespace:element attribute="CG_SUB_TOKEN:tokenName:CG_SUB_TOKEN"/>".

In embodiments of the present invention, one or more templates 304, 306 which obey the general syntactic and semantic constructs described above are created and stored in the template storage 402. A user of the client system 302 may desire using these templates for a number of purposes, such as for generating licenses for some resource or service, or for validating, interpreting and/or extracting data from existing licenses. It should be noted that the user at the client 302 does not necessarily need to be the same user that initially creates the templates 304, 306 for storage in the template storage 402, although it could be the same user. In the more common scenario, the user of the client 302 may not understand the syntax and semantics of a rights expression language, such as XrML, and thus will find one or more of the templates 304, 306 helpful for performing a particular task, although some knowledge of the particular rights expression language that the templates are written in may be helpful.

The templates 304, 306 can be used to address both simple and complex business models. If a user has a simple business model, the user can use one or more templates 304, 306 that include only those rights expression elements the business model requires. Thus, one is not forced to use the rights expression elements that are not applicable or needed for their particular business model. For example, a video rental business may require a single right, such as "play," and two conditions, such as a "flat fee" and a "validity time," so that the video can only be played during the rental period. One or more templates 304, 306 may include the appropriate rights expression elements needed to create licenses for this model, which may be selected and used by a user. If a user has a more complex business model, however, the user may need the full power and flexibility that is provided by a rights expression language, such as XrML. For example, a user may need to verify a consumer's subscription status, check for the most recent version of a document, allow consumers to lend digital works to others, or address a distribution chain of wholesalers, retailers, and consumers, for example. Thus, templates 304, 306 can be used to assist in creating licenses, which will be described further herein below. Further, the templates may be used to address both simple and complex business models.

Templates 304, 306 provide pre-written rights expressions that can be customized to describe common business models. Further, templates 304, 306 may be written in a manner that define portions of complete rights expressions or licenses, hereinafter referred to as "fragment templates," which users can combine in a plurality of combinations as appropriate to build customized business models and/or to add to other templates as token replacements. The templates 304, 306 reduce the effort required on the part of users by removing concerns about the rights expression structure and the amount of rights expressions (e.g., XrML) that are needed to be explicitly written. For example, an eBooks distributor may desire implementing a rights managements system using the rights expression manipulation system 300 that allows the distributor to sell protected content (i.e., eBooks). Moreover, the eBook distributor may have a business model in which consumers pay an upfront flat fee of $25.99 to copy, print, view and extract from an eBook, with no further conditions.

The distributor, using client 302 for example, may access the rights expression manipulation system 300 to request textual description summaries of one or more templates 304, 306 that are available. The client system 302 can receive these summaries from the system and display them on an associated display device for viewing by the distributor. The distributor may then read the summaries to determine which template is appropriate for their business model. For instance, upon viewing the available templates 304, 306, the user may read the following summary provided by system 300 of an "Unlimited Usage" template and conclude that it matches their business model:

| | |
|---|---|
| Template Catagory: | Consumption |
| Template Title: | Unlimited Usage |
| Template Description: | This tokenized template represents a license that grants some customer the right to play some book for some fee. |
| Tokens for this template: | CustomerId |
| | BookId |
| | Price |

In this example, the user selects this template and can use it to request the system 300 to create and issue licenses for eBooks, for example. Thus, the system 300 can generate a license, with unlimited play rights to the purchased eBook, for a paying customer. In this example, the "Unlimited Usage" template includes tokens for the customer id, the book id, and the price. Thus, each time a customer visits the distributor's eBooks Website to purchases an eBook, for example, the customer's id, the book's id, and the book's price along with the "Unlimited Usage" tokenized template can be passed into the system 300 as a method call. In response, the system 300 generates a license based upon the passed in template and values. Thus, the eBook distributor does not need to worry about learning a rights expression language, such as XrML, so that they can form the correct rights expression that semantically models their use case.

The system 300 for creating licenses based upon one or more tokenized templates will now be described with reference to FIGS. 3-10. The license creation module 500 is communicatively coupled to the template storage 402. In this embodiment, the license creation module 500 uses one or more tokenized templates to create a license instance 580 (FIG. 10). Further, in this embodiment, one or more of the tokenized templates include one or more general tokens.

The operation of the license creation module 500 will now be described. By way of example only, a user of the client 302 may desire accessing the system 300 to create a license based upon the Pay Per Use tokenized template shown in FIG. 4. Thus, the client system 302 will be configured to call the appropriate methods to request the rights expression manipulation system 300 to generate one or more licenses and/or license fragments. Moreover, the client system 302 is configured to supply the appropriate information to the rights expression manipulation system 300 through these method calls, as described further herein. Since some tokenized templates (e.g., Pay Per Use template 560 shown in FIG. 8) include tokens which are to be replaced with other tokenized fragment templates (i.e., keyholder template 540), the client 302 will be configured to use the module 500 to prepare license fragment instances based on these templates which will be needed to be passed in to the module 500 as each license instance is generated. Further, the client 302 is configured to present the user with one or more graphical user interfaces to elicit information it will need to send to the license creation module 500 based on the one or more templates it is using to create licenses. By way of example only, the client system 302 may use the following method call to request the module 500 to begin creating a license fragment:

License=CreateXrML("keyholder.xml",[modulus, exponent])

Figure 4:
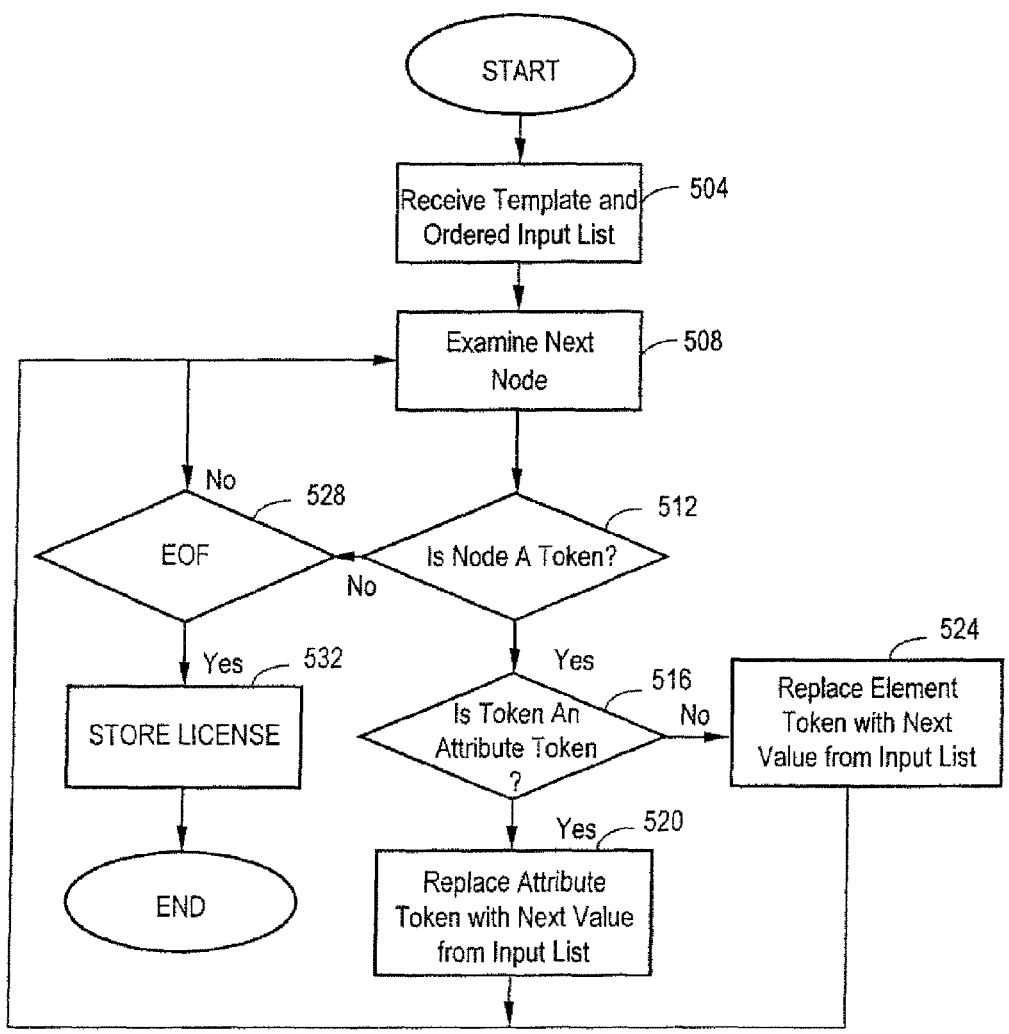
FIG. 4 is a flowchart of a rights expression processing system in accordance with the preferred embodiment of the present invention.

Referring to FIGS. 4 and 5, beginning at step 504, the client 302 sends a keyholder template 540, shown in FIG. 5, along with an input list that includes two values in this example, a modulus value and an exponent value. The input list may be variables or files. The module 500 performs a "depth first" search to find tokens in the template which need replacing.

Thus, at step 508, the license creation module 500 begins examining the template 540(1), and in particular, examining the nodes to determine whether they are tokens (e.g., element or identifier based). The module 500 is configured to look for the "cgXrML:token" syntax. In this example, the module 500 begins by getting the first or root node, the keyholder node 541 in the template 540, and examining the node.

At decision box 512, if the module 500 determines that the node 541 is a token, then the YES branch is followed. If the module 500 determines that the node 541 is not a token, which in this example it is not, then the NO branch is followed. Further, since the node is not a token, the module 500 stores the entire node contents into a memory storage for example, although it may store the node into a file which will represent the completed license.

At decision box 528, the module 500 proceeds through the template 540 and determines whether there is another node to examine or if an end of file ("EOF") marker has been reached. If an EOF marker has been reached, the YES branch is followed and the module 500 stores the license at step 532. If there is another node, then the NO branch is followed. Steps 508, 512, 528 are performed until either an EOF marker is reached at step 528 or the module 500 determines that the node being examined is a token and the YES branch is followed. In this example, the module 500 examines a node and determines it is a token (i.e., modulus token 542) at step 512, and thus the YES branch is followed.

At decision box 516, the module 500 examines the token 542 to determine which type of token (i.e., element or attribute) it is depending upon the placement of the "cgXrML:token" syntax within the token. In this example, the token 542 is an element token and not an attribute token, and therefore the token 542 is a placeholder for either an another token element or a value, and thus the NO branch is followed.

At step 524, the module 500 gets the next value from input list, the modulus value in this example, and replaces the entire token 542 with the value. Steps 508, 512, 528 are repeated until the module 500 finds the next token, the exponent token 544 in this example. Thus, steps 516 is repeated. In this example, the token 544 is also an element token, and thus step 524 is repeated, except the next value from the input list in this example (i.e., the exponent value) is substituted for the entire token 544.

If at decision box 516 the module 500 determines that the node contains a token that is an attribute token, then the next value in the input list would have been used to replace the portion of the XML element having the "cgXrML:token" syntax.

One or more of steps 508, 512, 516, 520, 524, 528 are repeated as appropriate until all of the tokens have been replaced with values from the input list, and the EOF marker is reached at step 528. At step 532 and referring to FIGS. 4 and 6, the module 500 stores the license fragment 546 in a memory, and sends the fragment 546 to the client 302. The client 302 may then store the license in a license memory 1000 for further processing as described herein. As shown in FIG. 6, the keyholder license instance fragment 546 is the same as the template 540 (FIG. 5) upon which it was based, except the values 548, 550 have been substituted for the tokens 542, 544, respectively.

Referring to FIGS. 7 and 8, one or more of steps 508, 512, 516, 520, 524, 528 are repeated as appropriate to create a digital work license fragment 552 and an issuer license fragment 554, which will be needed by a Pay Per Use template 560 shown in FIG. 9 during processing as described herein. Further in this example, a print right template (not illustrated) that does not contain any tokens is available, and may be expressed as "<cx:print/>" in this example.

By way of example only, the client system 302 may use the following method call to request the module 500 to begin creating a Pay Per Use license instance 560:

License=CreateXrML("PayPerUse.xml",[input list])

The input list in this example would include the following information:

1. [<keyHolder> ... </keyHolder>]
2. [<cx:print/>]
3. [<cx:digitalWork>...</cx:digitalWork>]
4. ["USD"]
5. ["2.00"]
6. ["139371581"]
7. ["111111"]
8. [<issuer> ... </issuer>]

Where a principal element (e.g., keyholder 540), a right element (e.g., "<cx:print/>"), a resource element (e.g., digitalwork 552), a value for the currency (e.g., "USD"), a value for the rate (e.g., "2.00"), a value for the bank institution (e.g., "139371581"), a value for the bank account (e.g., "111111") and an issuer element (e.g., issuer 554) form the input list.

Referring to FIGS. 4 and 9, one or more of steps 508, 512, 516, 520, 524, 528 are repeated as appropriate until all of the tokens have been replaced with values from the input list, and the EOF marker is reached at step 528. In particular, the module 500 examines the root node 562, determines it is not a token at decision box 512, then repeats steps 504, 508, 512 until it determines at decision box 512 that the principal node 564 includes a token. Steps 516 and 524 are performed to replace the principal node 564 with the keyholder fragment license instance fragment 540 passed in through the input list. Again, one or more of steps 508, 512, 516, 520, 524, 528 are repeated as described above to replace tokens 566, 568, except at decision box 516, the YES branch is followed since the module 500 determines that the currency node 570 is an attribute token, and thus step 520 is performed where the module 500 replaces the "cgXrML:token" syntax in the node with the next value from the input list (i.e., "USD"). One or more steps 508, 512, 516, 520, 524, 528 are again repeated as appropriate to replace the remaining tokens 572, 574, 576, 578 with the next value from the input list, and a pay per use license instance 580 shown in FIG. 10 is created and stored by the client system 302 in the license storage 1000. As shown in FIG. 10, the pay per use license instance 580 includes the keyholder fragment 582, digitalwork fragment 586, currency fragment 588, institution fragment 590, account fragment 592, and issuer fragment 594.

In an embodiment where tokenized templates have identifier based tokens, such as in the identifier based Pay Per Use tokenized template 596 shown in FIG. 11, one or more of steps 508, 512, 516, 520, 524, 528 are performed except as described herein. A template and a hash table having key/value pairs (i.e., token/value pairs) are passed to the module 500 method call. The input list in this example includes the following information:

| | |
|---|---|
| Principal | [<keyHolder> . . . </keyHolder>] |
| Right | [<cx:print/>] |
| Resource | [<cx:digitalWork> . . . </cx:digitalWork>] |
| RateCurrency | ["USD"] |
| RateCost | ["2.00"] |
| InstitutionRoutingNumber | ["139371581"] |
| AccountNumber | ["111111"] |
| Issuer | [<issuer> . . . </issuer>] |
| Principal | [<keyHolder> . . . </keyHolder>] |
| Right | [<cx:print/>] |
| Resource | [<cx:digitalWork> . . . </cx:digitalWork>] |
| RateCurrency | ["USD"] |
| RateCost | ["2.00"] |
| InstitutionRoutingNumber | ["139371581"] |
| AccountNumber | ["111111"] |
| Issuer | [<issuer> . . . </issuer>] |
| Principal | [<keyHolder> . . . </keyHolder>] |
| Right | [<cx:print/>] |
| Resource | [<cx:digitalWork> . . . </cx:digitalWork>] |
| RateCurrency | ["USD"] |
| RateCost | ["2.00"] |
| InstitutionRoutingNumber | ["139371581"] |
| AccountNumber | ["111111"] |
| Issuer | [<issuer> . . . </issuer>] |

In this embodiment, the module 500 is configured to be able to identify element tokens and attribute tokens within a template as described above. For each of the token elements returned, the module 500 gets the element's TOKENNAME identifier (e.g., "Principal", "Right", Resource", "RateCost", etc.), then examines the input list hash table to find the corresponding TOKENNAME identifier in the hash table to get its corresponding value. The module 500 then uses the value associated with the TOKENNAME to replace the token with. For each of the attribute tokens returned, the module 500 gets the element's TOKENNAME identifier (e.g., "RateCurrency", etc.), then examines the input list hash table to find the corresponding TOKENNAME identifier in the hash table to get its corresponding value, and step 520 is performed where the module 500 replaces the "CGTOKEN:RateCurrency:CGTOKEN" syntax in the node with the value in the hash table input list corresponding to the "RateCurrency" key (i.e., "USD").

The recited and illustrated order of processing steps set forth above in connection with this embodiment is merely exemplary and is not intended to limit the claimed processes to any order except as may be specified in the claims. Thus, the module 500 very easily accepts one or more templates and a list of values for tokens. A single line of code provided by the client 302, such as in the example provided above, can be used by the module 500 to automatically generate licenses that are thousands of lines long. One or more steps 508, 512, 516, 520, 524, 528 are performed as appropriate to replace the remaining tokens 572, 574, 576, 578 with the appropriate values from the input list.

Another embodiment of the system 300 for performing data parsing using one or more tokenized templates will now be described with reference to FIGS. 3, 5 and 6. The data parsing module 600 is communicatively coupled to the template storage 402. In this embodiment, the data parsing module 600 uses the keyholder tokenized template 540 in conjunction with the fragment 546 to extract data from the keyholder license fragment 546, although other templates may be used to extract data from other license instances and/or license instance fragments. Further, in this embodiment, the keyholder tokenized template fragment 540 includes one or more general tokens as mentioned above earlier.

By way of example only, the user of the client 302 is configured to send a request to the system 300, and in particular the data parsing module 600, to extract data from one or more licenses, such as the keyholder license fragment 546 in this example. For example, the client 302 may be configured to send the following method call to the module 600 for execution in the manner described herein:

DataOutputList=ParseXrML(["keyholder_A1.lic","keyholder.xml"])

Here, the "keyholder_A1.lic" value (e.g., variable, file) that is passed in to the module 600 through the method call represents the keyholder license fragment 546 that the client 302 desires to extract data from, and the "keyholder.xml" value represents the keyholder tokenized template 540 that was used to create the license fragment 546. Alternatively, the client 302 may omit the template 540 value. In such a case, the module 600 may be configured to analyze the templates stored in the template storage 402 in conjunction with the keyholder license fragment 546 to determine whether any templates match the fragment 546. This analysis process will be described further herein below. Once a matching template is found, the matched template is used to extract the data from the license as described in further detail below.

In particular, in this example, regardless of whether the keyholder tokenized template 540 is provided to the module 600 by the client 302 or the system 300 found the template 540, the module 600 begins examining each node in the template 540 and the fragment 54 in parallel. For example, the module 600 examines the keyholder node 541 in the keyholder tokenized template 540 to determine whether it is a token. The module also examines the keyholder node 541 in the keyholder license fragment 546. Since the keyholder license fragment 546 was created using the keyholder tokenized template 540 described above, the nodes should correspond or an error exception will occur. However, in this example they do correspond.

Next, the module 600 determines whether the node 541 is a token or a standard rights (e.g., XML) element. In this example, the module 600 determines that the node 541 in the keyholder license fragment 546 is not a token, and thus proceeds to examine the next node in the keyholder tokenized template 540. In this example, the module 600 examines the next node, the "<info>" node, and the nodes thereafter, and determines that none of these nodes are tokens. Again, as the module proceeds to examine each node in the keyholder tokenized template 540 it is examining the corresponding node in the keyholder license fragment 546. Finally, in this example, the module 600 examines a node in the keyholder tokenized template 540 and determines that it is a modulus token 542. The module 600 at this point then extracts the data from the keyholder license fragment 546 at the location that corresponds to the location of the token 542 that was found. In this example, the module 600 extracts the modulus value 548 from the keyholder license fragment 546, and stores the value in a temporary memory, for example. The module then repeats the same steps described above and continues to examine each node in the keyholder tokenized template 540 and the keyholder license fragment 546 in parallel until another token is found, in this example exponent token 544. As described above with respect to the modulus token 542, the module 600 extracts the exponent value 550 from the keyholder license fragment 546, and stores the value in a temporary, for example. Once all of data has been extracted, such as when the module 600 detects an EOF marker, the values stored in the temporary memory are sent to the client system 302.

The same process described above may be used to extract data from the pay per use license instance 580 shown in FIG. 10 using the pay per use tokenized template 560 shown in FIG. 9. Thus, the client 302 may make the following method call:

DataOutputList=ParseXrML(["pay_per_use_A1.lic", "pay_per_use.xml"])

Here, the "pay_per_use_A1.lic" value (e.g., variable, file) that is passed in to the module 600 through the method call represents the pay per use license instance 580 that the client 302 desires to extract data from, and the "pay_per_use.xml" value represents the pay per use tokenized template 560 that was used to create the license fragment 546.

The same steps described above with respect to extracting data from the keyholder license fragment 546 are performed to extract data from the pay per use license instance 580. In this example, the tokens in the tokenized template 560 correspond to license fragments which were placed in the license instance 580 as described above. For example, when the module 600 examines the principle node 564 in the pay per use tokenized template 560 and determines it is a token, it examines the corresponding node in the license instance 580, and finds the "<keyholder>" tag in the keyholder region 582. Thus, the module is configured to continue reading the data in that region 582 until it encounters a tag which instructs it to stop reading data from that region, such as the "</keyholder>" tag in this example. In this example, the module 600 provides the client 302 with an output list that includes the following information:

```
1. [<keyHolder> ... </keyHolder>]
2. [<cx:print/>]
3. [<cx:digitalWork>...</cx:digitalWork>]
4. ["USD"]
5. ["2.00"]
6. ["139371581"]
7. ["111111"]
8. [<issuer> ... </issuer>]
```

In an embodiment where tokenized templates have identifier based tokens, such as in the identifier based Pay Per Use tokenized template 596 shown in FIG. 11, the same process described above for extracting data from license instances or license instance fragments can be applied to extract data from license instances, such as the pay per use license instance 580, or license instance fragments, such as the keyholder license fragment 546, using identifier based tokenized templates. For instance, in the case of the pay per use license instance 580, the client 302 makes the method call for execution by the module 600, but here the client 302 passes the pay per use identifier based tokenized template 596 into the call along with the license instance 580.

In this embodiment, the module 600 is configured to be able to identify element tokens and attribute tokens within a template as described above. For each of the token elements returned, the module 500 gets the element's TOKENNAME identifier (e.g., "Principal", "Right", Resource", "RateCost", etc.), then extracts the data from the corresponding location in the license instance. For each of the attribute tokens returned, the module 500 gets the element's TOKENNAME identifier (e.g., "RateCurrency", etc.), then extracts the data from the corresponding location in the license instance.

Thus in this example, the module 600 extracts the corresponding data from the regions 582, 584, 586, 588, 590, 592, 594 in the license instance 580. As each portion of data is extracted from each region, the module 600 stores the corresponding TOKENNAME from the token at the corresponding location in the tokenized template 560. Once all of the data has been extracted from the license instance 580, the module 600 sends an output list that includes the following information:

| | |
|---|---|
| Principal | [<keyHolder> . . . </keyHolder>] |
| Right | [<cx:print/>] |
| Resource | [<cx:digitalWork> . . . </cx:digitalWork>] |
| RateCurrency | ["USD"] |
| RateCost | ["2.00"] |
| InstitutionRoutingNumber | ["139371581"] |
| AccountNumber | ["111111"] |
| Issuer | [<issuer> . . . </issuer>] |

In the first column, the TOKENNAME associated with the data is provided, and in the second column the data or the rights expression element (e.g., XML) from the license instance 580 corresponding to the token in the pay per use tokenized template 560 is provided.

Another embodiment of the system 300 for analyzing license instances or license fragment instances using one or more tokenized templates will now be described with reference to FIGS. 3 and 12-14I. The license analysis module 700 is communicatively coupled to the template storage 402, and further includes a validation sub-module 800 and an interpretation sub-module 900. In this embodiment, the license analysis module 700 handles requests from a client system 302, for example, to validate and/or interpret one or more license instances and/or license instance fragments.

The license analysis module sends these requests to the sub-modules 800, 900 as appropriate.

Figure 12:
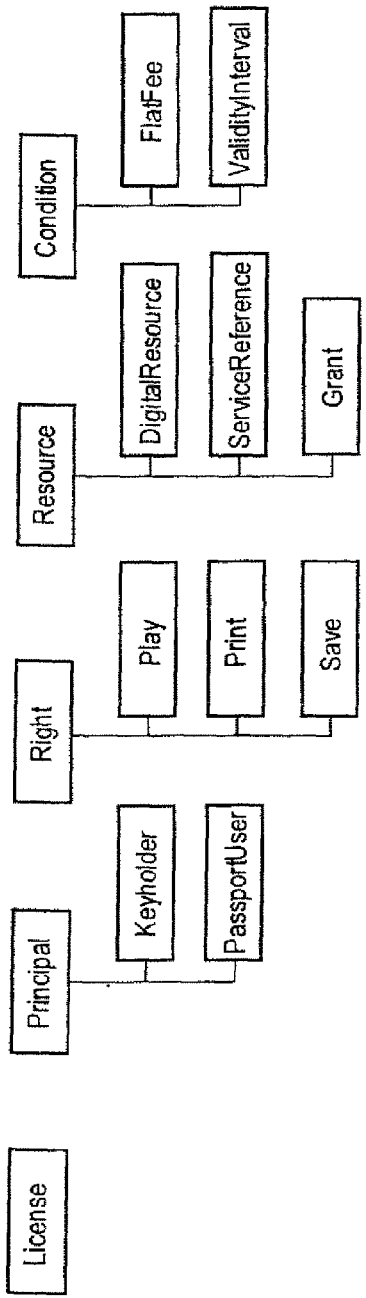
FIG. 12 is type hierarchy that shows relationships between rights expression elements.

An embodiment of the system 300 for validating licenses using a validation sub-module 800 will now be described. Referring to FIG. 12, a schematic illustration of a type hierarchy, such as a set of inheritance trees, which defines relationships between rights expression elements in the exemplary template shown in FIG. 13 and the exemplary template fragments 14A-14I. Thus, in this example, KeyHolder and PassportUser elements (FIGS. 14A, 14B) are principals; Play, Print, and Save (FIGS. 14C, 14D, 14E) are rights; DigitalResource and WebService (FIGS. 14F, 14G), and Grant (not illustrated), are resources; and FlatFee and ValidityInterval are conditions (FIGS. 14I, 14J). The system 300, and hence the validation sub-module 800, are configured to understand these relationships. Moreover, this exemplary hierarchy is stored in a memory in the system 300.

By way of example only, the client system 302 may pass the following method call to the system 300:

valid_license=validate(["model_template","example_license.lic"])

The license analysis module 700 in turn passes the method call to the validation sub-module 800 for execution thereof as described herein. The "model_template" value represents a template (e.g., FIG. 13) that the client system 302 desires the validation sub-module 800 to use during validation. Alternatively, the client 302 does not need to provide a model template. In this case, the sub-module is configured to perform the validation process described herein using one or more model templates that may be available in template storage 402. Moreover, once all the elements in the license instance are found to be of the allowable types according to the type hierarchy set forth in FIG. 12, then the sub-module 800 determines that the license instance is valid. The "example_license.lic" is a license which a user of the client system 302 desires validating. In this example, the "example_license.lic" license instance that a user of the client 302 desires validating may be expressed using pseudo code in the following manner:

```
License
    Grant
        KeyHolder
            Mai's Keys
        End KeyHolder
        Play
        End Play
        DigitalResource
        www.edgar.com/docs/XrMLTechTalk.pdf
        End DigitalResource
        FlatFee
            $10
        End FlatFee
    End Grant
    Issuer
        Edgar's signature
    End Issuer
End License
```

Figure 13:
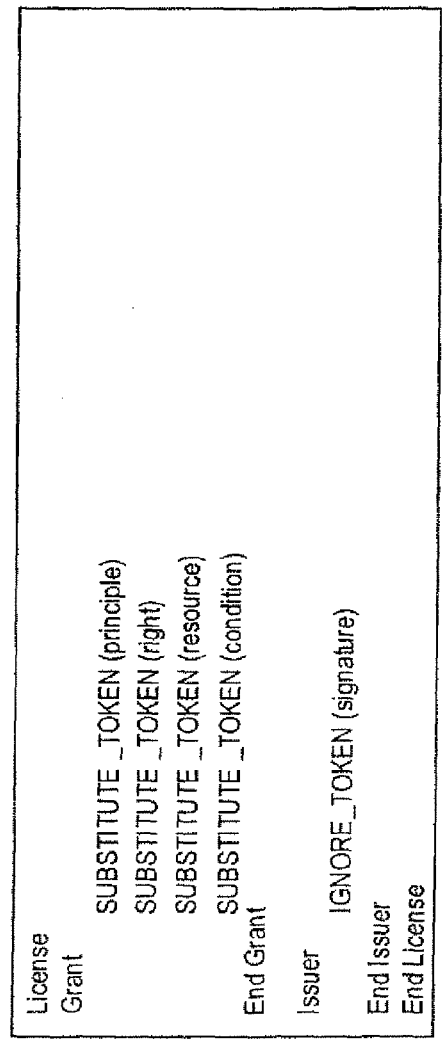
FIG. 13 is a template example in a pseudo rights expression grammar.

Referring to FIG. 13, an exemplary model license template expressed using pseudo code is illustrated. In this example, it is assumed that this model template is a valid rights expression that is written in any rights expression language, such as XrML. Further, FIGS. 14A-14I illustrate fragment templates that are also valid rights expression elements and are written in any rights expression language, such as XrML. It should be noted that there may be a fewer or greater number of fragment templates other than those illustrated in FIGS. 14A-14I. The model template shown in FIG. 13 includes one or more types of tokens, such as a first type of token (i.e., IGNORE_TOKEN) that indicates to the validation sub-module 800 that the associated data should be ignored. A second type of token (i.e., SUBSTITUTE_TOKEN) indicates to the sub-module 800 that the token is a placeholder for another template of a particular type (e.g., principal, right, resource, etc.) as defined in the exemplary hierarchy illustrated in FIG. 12.

Accordingly, in this embodiment, the validation process begins by the validation sub-module 800 matching elements in the "example_license.lic" license instance with all the combinations of syntax that could be formed by template substitutions as dictated by the type hierarchy illustrated in FIG. 13. The sub-module 800 is configured to examine each element in the model template in parallel with each element in the "example_license.lic" license instance. When non-token elements, such as "License" and "Grant", are encountered in the model template, the sub-module 800 determines whether the associated element in the corresponding location within the license instance is the same. If the corresponding element is not the same, then the sub-module 800 may return a value to the client 302 indicating that the license instance is not valid. Alternatively, the sub-module can be configured to focus on determining whether just the elements associated with the tokens in the model template are the same as the elements in the license instance. Moreover, the sub-module 800 may be configured to ignore variations in character spacing and/or the use of lower or upper case, for example.

As the sub-module 800 examines each element in the model template and the license instance, when tokens are encountered in the model template, the sub-module 800 is configured to determine whether the token is an IGNORE_TOKEN or a SUBSTITUTE_TOKEN. If the token is an IGNORE_TOKEN type, then the sub-module 800 ignores any data that is inside of the rights expression or element at that location in the license instance, and compares the elements to determine whether they are the same or match. If the token is a SUBSTITUTE_TOKEN type, then the sub-module 800 will examine the corresponding element in the license instance to determine whether the element is one of the types defined in the hierarchy illustrated in FIG. 12. For example, the first token in the model template shown in FIG. 13 allows the sub-module to substitute any element from the license instance at the corresponding location that is of a type principal. Referring to the type hierarchy in FIG. 12 and the fragment templates shown in FIGS. 14A-14I, a KeyHolder template (FIG. 14A) or a PassportUser template (FIG. 14B) may be substituted. For the next token, any element that is of a type right could be substituted, such as Play (FIG. 14C), Print (FIG. 14D), or Save template (FIG. 14E), and so forth, for each subsequent token in the example model template illustrated in FIG. 13. The sub-module compares each element in the license instance with each of the template fragments of the particular type for the token to find a match, while ignoring any data associated with an element in the license instance that corresponds to an IGNORE_TOKEN token in the model template.

Referring back to the exemplary "example_license.lic" license instance provided above, the sub-module 800 determines that each of the elements in the instance that correspond to the tokens in the model template are of the same type according to the hierarchy shown in FIG. 12. For example, the license instance includes the KeyHolder, Play, DigitalResource and FlatFee elements, which are all defined as being valid element types (e.g., Principle, Right, Resource, Condition) in FIG. 12. Accordingly, the sub-module sends a value to the client 302 to indicate that the license instance is valid. Further, the elements in the license instance are in the same position as in the model template, although the sub-module 800 may be configured to ignore the positions of the elements in the license instance. For example, when the module 800 examines the "SUBSTITUTE_TOKEN (principle)" token, it can be configured to search the license instance for any element that is of a type Principle, rather than require an exact match with respect to the position of the token within the license instance.

While the sub-module is matching elements in the model template with corresponding elements in the license instance, it stores the matching elements from the model templates together in a memory or as a separate file. Further, an example of the combined template which is produced from merging all of the matching templates that were found to correspond to the elements in the license instance is shown below:

```
License
    Grant
        KeyHolder
            IGNORE_TOKEN (keys)
            End KeyHolder
        Play
        End Play
        DigitalResource
            IGNORE_TOKEN (URL)
            End DigitalResource
        FlatFee
            IGNORE_TOKEN (rate)
            End FlatFee
    End Grant
    Issuer
        IGNORE_TOKEN (signature)
    End Issuer
        End License
```

This combined template may be useful to the user of client 302 for a number of reasons, such as where the license instance was not generated by the system 300 using one or more tokenized templates and the user desires having a valid, well formed tokenized template to use for easily generating additional license templates. Tokenized templates can be used to validate and/or determine support for the structure or syntax of rights expressions. The validation sub-component 800 is a lightweight validation component that does not require an undue amount of system resources. To add new knowledge to the system 300, and hence the validation sub-component 800, the user can simply register additional template(s). This could be as simple as placing the new template(s) within a specific location/directory within the system 300, such as the templates storage 402, providing excellent lower end scalability. Devices that require small footprints can easily operate the system 300, and hence the validation sub-module 800.

An alternative embodiment of the validation sub-module 800 will now be described. In this embodiment, a model template, such as the template illustrated in FIG. 13, would include complete sets of rights expressions rather than tokens (e.g., SUBSTITUTE_TOKEN) that indicate which tokenized fragment templates can be used to compare the license instance elements with. Thus, in this embodiment, the model template would be the same as the model template shown in FIG. 13, except that the SUBSTITUTE_TOKEN tokens would be replaced by the actual rights expression elements. The validation process would then involve comparing the elements in the model template(s) with the corresponding elements in the license instance to determine whether they match. If no match is found after comparing the rights expression instance against the model template(s), the validation sub-module 800 sends a value to the client 302 indicating that the license instance is invalid.

The recited order of processing steps set forth in connection with the above-described embodiments is not intended to limit the claimed processes to any order except as may be specified in the claims.

Another embodiment of the system 300 for interpreting licenses using an interpretation sub-module 900 will now be described with reference to FIGS. 3 and 14A-14I. By way of example only, a user may desire interpreting the meaning of license instances or license fragment instances, such as licenses 606. By way of example only, the client system 302 may pass the following method call to the system 300:

license_interpretation=interpret(["example_license.lic"])

The license analysis module 700 passes the method call to the interpretation sub-module 900 for execution thereof as described herein. The client 302 may optionally pass tokenized templates into the method call that it may want the interpretation sub-module 900 to use during interpretation, although the sub-module 900 may access templates stored in the template storage 402.

In this embodiment, the interpretation sub-module 900 performs the same process as the validation sub-module 800 to find tokenized templates or tokenized template fragments which match one or more license instances or license fragment instances, except in this embodiment the sub-module 900 stores the names of the files containing the matching template(s). Referring back to the exemplary "example_license.lic" license instance provided above, the sub-module 900 determines that each of the elements in the instance that correspond to the tokens in the model template are of the same type according to the hierarchy shown in FIG. 12. For example, the exemplary license instance includes the KeyHolder, Play, DigitalResource and FlatFee elements, which are all defined as being valid element types (e.g., Principle, Right, Resource, Condition) in FIG. 12. Accordingly, these elements match the templates shown in FIGS. 14A, 14B, 14F, 14H. Thus, the sub-module 900 stores the file names of these templates. Further, in this embodiment the sub-module 900 maintains a database in a memory of the system 300 that includes semantic mappings between templates and human-readable descriptions. Thus, as templates are matched, they may be cross-referenced with this database to determine the appropriate meanings of the matched template(s). An exemplary table showing one or more matched templates and their associated meanings is provided below:

| Template File Name | Description |
| --- | --- |
| PayPerView.tem | TOKEN(person) can view TOKEN(book) for TOKEN(price). |
| ExerciseLimit.tem | TOKEN(person) can play TOKEN(book) only TOKEN(exerciseCount) times. |
| DistributionRights.tem | TOKEN(distributor) can sell any book published by TOKEN(publisher). |
| Lending.tem | TOKEN(person) can lend TOKEN(book) to any of his friends. |
| EmployeeCertificate.tem | TOKEN(person) is a ContentGuard employee. |

The interpretation sub-module 900 sends this information to the client 302. The client 302 is configured to provide this information to a user using a graphical user interface, for example. Thus, the client 302 may be configured to display human-readable descriptions of the templates that match a license instance. User can use this information for a variety of reasons, such as for easily interpreting the meaning of created license instances without requiring users to analyze the rights expression language the license is written in.

In an alternative embodiment, the sub-module 900 maintains a database in a memory of the system 300 that includes semantic mappings between templates and method calls. Thus, as templates are matched, they may be cross-referenced with this database to determine the appropriate method call for the matched template(s). In this embodiment, the method calls represent the action that should be performed by the system 300 when the associated template is matched. Thus, this embodiment of the present invention allows the system 300 to map the semantics of a license instance or license instance fragment to semantics expressed via APIs (e.g., methods/functions). An exemplary table showing one or more matched templates and their associated method calls is provided below:

| Template File Name | Method To Call |
| --- | --- |
| PayPerView.tem | PayPerView(TOKEN(person), TOKEN(book), TOKEN(price)) |
| ExerciseLimit.tem | ExerciseLimit(TOKEN(person), TOKEN(book), TOKEN(exerciseCount)) |
| DistributionRights.tem | DistributionRights(TOKEN(distributor), TOKEN(publisher)) |
| Lending.tem | Lending(TOKEN(person), TOKEN(book), FLAG_ANYONE) |
| EmployeeCertificate.tem | EmployeeCertificate(TOKEN(person), "ContentGuard") |

The recited order of processing steps set forth in connection with the above-described embodiments is not intended to limit the claimed processes to any order except as may be specified in the claims.

In view of the discussion above, it should now be apparent that the rights expression processing system in accordance with one embodiment of the present invention provides a novel and advantageous system that may be used to manipulate grammar based rights expression, such as for generating, modifying, and validating grammar based rights expressions.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications as defined by the appended claims and legal equivalents.

What is claimed is:

1. At least one non-transitory computer-readable medium storing computer-readable instructions that, when executed by one or more computing devices, cause at least one of the one or more computing devices to:
   process a license template including rights expression statements based on a defined grammar and including at least one token, the token having an identifier and defining a place holder for a data item;
   receive at least one data item, the at least one data item including an identifier;
   identify at least one token matching the at least one data item, by matching identifiers of tokens and data items;

generate a license by replacing the identified at least one token in the license template with a value of the at least one data item matched to the identified at least one token, the license being enforceable by a computing device; and store the generated license in computer readable form.

2. The at least one non-transitory computer-readable medium of claim 1, wherein the license is a rights expression.

3. The at least one non-transitory computer-readable medium of claim 1, wherein the rights expression statements are expressed in a rights expression language.

4. The at least one non-transitory computer-readable medium as set forth in claim 1, wherein the instructions that, when executed by one or more computing devices, cause at least one of the one or more computing devices to process the license template further cause at least one of the one or more computing devices to process a plurality of license templates.

5. The at least one non-transitory computer-readable medium as set forth in claim 1, wherein the instructions that, when executed by one or more computing devices, cause at least one of the one or more computing devices to receive the at least one data item further cause at least one of the one or more computing devices to receive at least one input list of the data items.

6. The at least one non-transitory computer-readable medium as set forth in claim 1, wherein at least one of the license template and the at least one data item is received from a client computing device.

7. The at least one non-transitory computer-readable medium as set forth in claim 1, wherein the client computing device is at least one of the one or more computing devices.

8. The at least one non-transitory computer-readable medium as set forth in claim 1, wherein the at least one token is an attribute token.

9. The at least one non-transitory computer-readable medium as set forth in claim 5, wherein the instructions that, when executed by one or more computing devices, cause at least one of the one or more computing devices to receive the at least one data item further cause at least one of the one or more computing devices to receive the at least one input list from an application program interface.

10. The at least one non-transitory computer-readable medium as set forth in claim 5, wherein the instructions that, when executed by one or more computing devices, cause at least one of the one or more computing devices to receive the at least one data item further cause at least one of the one or more computing devices to receive the at least one input list from a graphical user interface.

11. The at least one non-transitory computer-readable medium as set forth in claim 5, wherein the input list is a hash table of key and value pairs.

12. The at least one non-transitory computer-readable medium as set forth in claim 6, wherein the generated license is returned to the client computing device.

13. A computer-implemented method executed by one or more computing devices for generating a license the method comprising:

processing, by at least one of the one or more computing devices, a license template including rights expression statements based on a defined grammar and including at least one token, the token having an identifier and defining a place holder for a data item;

receiving, by at least one of the one or more computing devices, at least one data item, the at least one data item including an identifier;

identifying, by at least one of the one or more computing devices, at least one token matching the at least one data item, by matching identifiers of tokens and data items;

generating, by at least one of the one or more computing devices, a license by replacing the identified at least one token in the license template with a value of the at least one data item matched to the identified at least one token, the license being enforceable by a computing device; and storing, by at least one of the one or more computing devices, the generated license in computer readable form.

14. The method as set forth in claim 13, wherein the rights expression statements are expressed in a rights expression language.

15. The method as set forth in claim 13, wherein processing the license template further comprises processing a plurality of license templates.

16. The method as set forth in claim 13, wherein receiving the at least one data item further comprises receiving at least one input list of the data items.

17. The method as set forth in claim 13, wherein at least one of the license template and the at least one data item is received from a client computing device.

18. The method as set forth in claim 17, wherein the client computing device is at least one of the one or more computing devices.

19. The method as set forth in claim 13, wherein the at least one token is an attribute token.

20. The method as set forth in claim 16, wherein receiving the at least one data item further comprises receiving the at least one input list from an application program interface.

21. The method as set forth in claim 16, wherein receiving the at least one data item further comprises receiving the at least one input list from a graphical user interface.

22. The method as set forth in claim 16, wherein the input list is a hash table of key and value pairs.

23. The method as set forth in claim 17, wherein the generated license is returned to the client computing.

24. The method as set for in claim 13, wherein the license is a rights expression.

25. The at least one non-transitory computer-readable medium as set forth in claim 1, wherein the at least one data item matched to the identified at least one token includes a key and the value is associated with the key.

26. The method of claim 13, wherein the at least one data item matched to the identified at least one token includes a key and the value is associated with the key.

27. An apparatus for generating a license, the apparatus comprising:

one or more processors; and one or more memories operatively coupled to at least one of the one or more processors and having instructions stored thereon that, when executed by at least one of the one or more processors, cause at least one of the one or more processors to:

process a license template including rights expression statements based on a defined grammar and including at least one token, the token having an identifier and defining a place holder for a data item;

enable the receipt at least one data item, the at least one data item including an identifier;

identify at least one token matching the at least one data item, by matching identifiers of tokens and data items;

generate a license by replacing the identified at least one token in the license template with a value of the at least one data item matched to the identified at least one token, the license being enforceable by a computing device; and enable the storage of the generated license in computer readable form.

28. The apparatus as set forth in claim 27, wherein the license is a rights expression.

29. The apparatus as set forth in claim 27, wherein the rights expression statements are expressed in a rights expression language.

30. The apparatus as set forth in claim 27, wherein the instructions that, when executed by at least one of the one or more processors, cause at least one of the one or more processors to process the license template further cause at least one of the one or more processors to process a plurality of license templates.

31. The apparatus as set forth in claim 27, wherein the instructions that, when executed by at least one of the one or more processors, cause at least one of the one or more processors to enable the receipt of the at least one data item further cause at least one of the one or more processors to enable the receipt of at least one input list of the data items.

32. The apparatus as set forth in claim 27, wherein at least one of the license template and the at least one data item is received from a client computing device.

33. The apparatus as set forth in claim 27, wherein the at least one token is an attribute token.

34. The apparatus as set forth in claim 31, wherein the instructions that, when executed by at least one of the one or more processors, cause at least one of the one or more processors to enable the receipt of the at least one data item further cause at least one of the one or more processors to enable the receipt of the at least one input list from an application program interface.

35. The apparatus as set forth in claim 31, wherein the instructions that, when executed by at least one of the one or more processors, cause at least one of the one or more processors to enable the receipt of the at least one data item further cause at least one of the one or more processors to enable the receipt of the at least one input list from a graphical user interface.

36. The apparatus as set forth in claim 31, wherein the input list is a hash table of key and value pairs.

37. The apparatus as set forth in claim 32, wherein the generated license is returned to the client computing device.

38. At least one non-transitory computer-readable medium storing computer-readable instructions that, when executed by one or more computing devices, cause the at least one of the one or more computing devices to:

process a license template including rights expression statements based on a defined grammar and including at least one attribute token, the rights expression statements being expressed in a rights expression language, the attribute token having an identifier and defining a place holder for a data item, receive at least one data item also including an identifier and including a key and a corresponding value associated with the key;

identify at least one attribute token matching the at least one data item, by matching identifiers of attribute tokens and data items;

generate a license by replacing the identified at least one attribute token in the license template with the value of the at least one data item matched to the identified at least one attribute token, the license being enforceable by a computing device; and store the generated license in computer readable form.

39. The at least one non-transitory computer-readable medium of claim 38, wherein the license is a rights expression.

40. The at least one non-transitory computer-readable medium of claim 38, wherein the instructions that, when executed by at least one of the one or more computing devices, cause at least one of the one or more computing devices to process a license template further cause at least one of the one or more computing devices to process a plurality of license templates.

41. The at least one non-transitory computer-readable medium of claim 38, wherein at least one of the license template and the at least one data item is received from a client computing device.

42. The at least one non-transitory computer-readable medium of claim 38, wherein the client computing device is at least one of the one or more computing devices.

43. The at least one non-transitory computer-readable medium of claim 38, further storing instructions that, when executed by at least one of the one or more computing devices, cause at least one of the one or more computing devices to receive at least one input list of the data items.

44. The at least one non-transitory computer-readable medium of claim 43, wherein the at least one input list is received from an application program interface.

45. The at least one non-transitory computer-readable medium of claim 43, wherein the at least one input list is received from a graphical user interface.

46. The at least one non-transitory computer-readable medium of claim 43, wherein the input list is a hash table of key and value pairs.

* * * * *